(12) United States Patent
Yamada

(10) Patent No.: US 8,979,400 B2
(45) Date of Patent: Mar. 17, 2015

(54) DRIVE MECHANISM FOR MOVABLE MIRROR OF CAMERA

(71) Applicant: Ricoh Imaging Company, Ltd., Tokyo (JP)

(72) Inventor: Toshiaki Yamada, Saitama (JP)

(73) Assignee: Ricoh Imaging Company, Ltd., Tokyo (JP)

( * ) Notice: Subject to any disclaimer, the term of this patent is extended or adjusted under 35 U.S.C. 154(b) by 0 days.

(21) Appl. No.: 14/339,869

(22) Filed: Jul. 24, 2014

(65) Prior Publication Data
US 2015/0043901 A1 Feb. 12, 2015

(30) Foreign Application Priority Data
Aug. 8, 2013 (JP) .................. 2013-164930

(51) Int. Cl.
G03B 17/00 (2006.01)
G03B 19/12 (2006.01)

(52) U.S. Cl.
CPC ...................... *G03B 19/12* (2013.01)
USPC ......................................................... 396/447

(58) Field of Classification Search
USPC ....................................................... 396/447
See application file for complete search history.

(56) References Cited

U.S. PATENT DOCUMENTS

| | | | |
|---|---|---|---|
| 8,608,391 B2 | 12/2013 | Yamada | |
| 8,753,024 B2 | 6/2014 | Yamada | |
| 8,783,972 B2 | 7/2014 | Yamada | |
| 8,790,023 B2 | 7/2014 | Yamada | |
| 2012/0063763 A1* | 3/2012 | Yamada | ........................ 396/447 |
| 2012/0257883 A1* | 10/2012 | Seita | ............................. 396/358 |
| 2013/0108257 A1* | 5/2013 | Yamada | ........................ 396/447 |
| 2013/0136441 A1 | 5/2013 | Yamada | |

FOREIGN PATENT DOCUMENTS

| | | |
|---|---|---|
| JP | 09-203972 | 8/1997 |
| JP | 09-203973 | 8/1997 |
| JP | 2012-063452 | 3/2012 |
| JP | 2012-063453 | 3/2012 |
| JP | 2012-063454 | 3/2012 |
| JP | 2013-054084 | 3/2013 |

\* cited by examiner

*Primary Examiner* — Clayton E Laballe
*Assistant Examiner* — Dennis Hancock
(74) *Attorney, Agent, or Firm* — Greenblum & Bernstein P.L.C.

(57) ABSTRACT

A camera movable-mirror drive mechanism includes a first shock-absorbing member, pushed by a main-mirror support member to absorb shock when the main-mirror support member rotates to a viewfinder light-guiding position; a second shock-absorbing member, pushed by the main-mirror support member when the main-mirror support member rotates to the retracted position; and a third shock-absorbing member, pushed by a sub-mirror support member to absorb shock when the sub-mirror support member rotates to a jutting position with rotation of the main-mirror support member to the viewfinder light-guiding position. When the main-mirror support member and the sub-mirror support member are in the viewfinder light-guiding position and the jutting-out position, respectively, the first shock-absorbing member is held by the second shock-absorbing member and does not contact the main-mirror support member and the third shock-absorbing member is held by the first shock-absorbing member and does not contact the sub-mirror support member.

8 Claims, 15 Drawing Sheets

DRIVE MECHANISM FOR MOVABLE MIRROR OF CAMERA

BACKGROUND OF THE INVENTION

1. Field of the Invention

The present invention relates to a drive mechanism for driving a movable mirror provided in a camera (e.g., an SLR camera), and in particular to a mechanism, provided in association with the drive mechanism, for suppressing bouncing of the movable mirror.

2. Description of the Related Art

In SLR cameras, a movable mirror (quick-return mirror) is provided, which is capable of moving up and down. More specifically, the movable mirror is capable of rotating between a mirror-down state, in which the movable mirror is positioned in a photographing optical path to reflect incident light emanated from an object (object-emanated light) toward a viewfinder optical system, and a mirror-up state, in which the movable mirror is retracted from the photographing optical path to allow the object-emanated light to travel toward a shutter. A movable mirror which is provided with a main mirror, which is for leading object-emanated light to the viewfinder optical system, and a sub-mirror, which is for leading object-emanated light to a distance measuring sensor and a photometering sensor, is known in the art. The sub-mirror is mounted to the back of the main mirror. When the movable mirror is in the mirror-down state, the sub-mirror is positioned in a photographing optical path at a different angle from the main mirror to reflect part of the object-emanated light passing through the main mirror. When the movable mirror is in the mirror-up position, the sub-mirror retracts to the back (underside) of the main mirror from the photographing optical path.

Upon the movable mirror bouncing (vibrating) upon impact against a stopper when performing a mirror-up operation or a mirror-down operation, vibrations of the movable mirror may cause such problems as camera shake and unstable viewfinder images, thereby exerting an adverse influence on observational performance and limitations to continuous shooting performance. Accordingly, various mechanisms for suppressing bouncing of the movable mirror have been proposed (e.g., Japanese Unexamined Patent Publication H09-203972, Japanese Unexamined Patent Publication H09-203973, and Japanese Unexamined Patent Publication No. 2012-63452).

A type of mechanism which makes the movable mirror come into contact with an elastic member and another type of mechanism which makes the movable mirror come into contact with a movable member which is biased to move by a biaser are known in the art as mechanisms for suppressing bouncing of the movable mirror. However, since a high positioning accuracy of the movable mirror is required mainly when the movable mirror is in the mirror-down position, the positioning of the movable mirror is required to be carried out using a special-purpose positioning member and the mirror bounce-suppressing mechanisms need to be constructed so as not to interfere with the positioning of the movable mirror that is carried out using this special positioning member. In other words, the mirror bounce-suppressing mechanisms are not only required to suppress bouncing of the movable mirror when the movable mirror rotates but also required not to interfere with the positioning of the movable mirror upon the movable mirror reaching either rotational limit position (rotating end) thereof, thus tending to be complicated in structure.

To solve these problems, a simple-structured bounce-suppressing mechanism which is equipped with an interference prevention feature with which no influence is exerted on the positioning accuracy of the main mirror, which constitutes a component of the movable mirror, at a rotational limit position thereof has been proposed in Japanese Unexamined Patent Publication No. 2012-63452. However, in the case of a camera in which a main mirror and a sub-mirror constitute a movable mirror (quick-return mirror), it is desirable to securely suppress not only bouncing of the main mirror but also bouncing of the sub-mirror from the viewpoint of improvement in performance. However, if it is attempted to provide the camera with an individual mirror bounce-suppressing mechanism having the aforementioned interference prevention feature for each of the main mirror and the sub-mirror, the structure will become more complicated.

SUMMARY OF THE INVENTION

The present invention has been devised with consideration of the above described problems and provides a drive mechanism for driving a movable mirror of a camera, wherein the drive mechanism can suppress bouncing of the movable mirror without exerting an influence on the positional accuracy of the main mirror or the sub-mirror while having a small number of components and being simple in structure.

According to an aspect of the present invention, a movable-mirror drive mechanism of a camera is provided, including a main-mirror support member which supports a main mirror and is supported to be rotatable about a first axis between a viewfinder light-guiding position, in which the main mirror is positioned in a photographing optical path to reflect incident light emanated from an object toward a viewfinder optical system of the camera, and a retracted position, in which the main mirror is retracted from the photographing optical path to allow the object-emanated light to travel toward a photographic light-receiving medium; a sub-mirror support member which supports a sub-mirror and is supported to be rotatable relative to the main-mirror support member about a second axis which is substantially parallel to the first axis and is positioned in a jutting-out position, in which the sub-mirror juts from the main mirror in the photographing optical path, when the main-mirror support member is in the viewfinder light-guiding position, and which is positioned in a sub-mirror retracted position, in which the sub-mirror is retracted to a back of the main mirror, when the main-mirror support member is in the retracted position; a first shock-absorbing member which is held in a first shock-absorbing stand-by position by a first biaser, the first shock-absorbing member coming into contact with the main-mirror support member and being pressed and moved thereby against a biasing force of the first biaser to absorb shock of the main-mirror support member when the main-mirror support member rotates from the retracted position to the viewfinder light-guiding position; a second shock-absorbing member which is held in a second shock-absorbing stand-by position by a second biaser, the second shock-absorbing member coming into contact with the main-mirror support member and being pressed and moved thereby against a biasing force of the second biaser to absorb shock of the main-mirror support member when the main-mirror support member rotates from the viewfinder light-guiding position to the retracted position; and a third shock-absorbing member which is held in a third shock-absorbing stand-by position by a third biaser, the third shock-absorbing member coming into contact with the sub-mirror support member and being pressed and moved thereby against a biasing force of the third biaser to absorb shock of the sub-mirror support member when the sub-mirror support member rotates from the sub-mirror retracted position to the jutting-out position in association with rotation of the main-mirror support member to the viewfinder light-guiding position. When the main-mirror support member is in the viewfinder light-guiding position, the first shock-absorbing member is held in a non-contact position with respect to the main-mirror support member by the second shock-absorbing member positioned in the second shock-absorbing stand-by position. When the sub-mirror support member is in the jutting-out position, the third shock-absorbing member is held in a non-contact position with respect to the sub-mirror support member by the first shock-absorbing member.

The moving manner of each shock-absorbing member is optional; however, as an example, each of the first shock-absorbing member and the third shock-absorbing member is rotatable about an axis substantially parallel to the first axis and the second axis, wherein the first shock-absorbing member is disengaged from the third shock-absorbing member when held in the first shock-absorbing stand-by position, the first shock-absorbing member including a press portion which comes into contact with the third shock-absorbing member and presses and moves the third shock-absorbing member to the non-contact position with respect to the sub-mirror support member when the first shock-absorbing member rotates to the non-contact position with respect to the main-mirror support member.

It is desirable for the second shock-absorbing member to be linearly movable along a plane in which the first shock-absorbing member rotates, and for the second shock-absorbing member to include a rotation-restricting portion which moves into a path of rotational movement of the first shock-absorbing member to restrict a range of rotational movement of the first shock-absorbing member when the second shock-absorbing member is in the second shock-absorbing stand-by position, and which retracts from the path of rotational movement of the first shock-absorbing member when the second shock-absorbing member is pressed and moved from the second shock-absorbing stand-by position by the main-mirror support member in a direction opposite to a biasing direction of the second biaser.

In the case where the above described movable-mirror drive mechanism is installed in a camera, it is desirable for the first shock-absorbing member, the second shock-absorbing member and the third shock-absorbing member to be supported by a side of a mirror box, of the camera, that supports the main-mirror support member and the sub-mirror support member inside the mirror box. Each of the first shock-absorbing member and the second shock-absorbing member includes a projection which projects into the inside of the mirror box to lie on a rotational movement path of the main-mirror support member. The third shock-absorbing member includes a projection which projects into the inside of the mirror box to lie on a rotational movement path of the sub-mirror support member. The movable-mirror drive mechanism includes, inside the mirror box, a main-mirror positioning portion which defines the viewfinder light-guiding position of the main-mirror support member and a sub-mirror positioning portion which defines the jutting-out position of the sub-mirror support member. The second shock-absorbing member holds the first shock-absorbing member in a position in which the protrusion of the first shock-absorbing member is disengaged from the main-mirror support member when the main-mirror support member is held in the viewfinder light-guiding position by engagement with the main-mirror positioning portion. The first shock-absorbing member holds the third shock-absorbing member in a position in which the protrusion of the third shock-absorbing member is disengaged from the sub-mirror support member when the sub-mirror support member is held in the jutting-out position by engagement with the sub-mirror positioning portion.

It is desirable for the mirror box to include a first stopper which comes into contact with the first shock-absorbing member by the biasing force of the first biaser to define the first shock-absorbing stand-by position; a second stopper which comes into contact with the second shock-absorbing member by the biasing force of the second biaser to define the second shock-absorbing stand-by position; and a third stopper which comes into contact with the third shock-absorbing member by the biasing force of the third biaser to define the third shock-absorbing stand-by position.

It is desirable for the first biaser, the second biaser and the third biaser to be a first spring, a second spring and a third spring, respectively, which are independent of one another.

In another embodiment, a movable-mirror drive mechanism of a camera is provided, including a main-mirror support member which supports a main mirror and is supported to be rotatable about a first axis between a viewfinder light-guiding position, in which the main mirror is positioned in a photographing optical path to reflect incident light emanated from an object toward a viewfinder optical system of the camera, and a retracted position, in which the main mirror is retracted from the photographing optical path to allow the object-emanated light to travel toward a photographic light-receiving medium; a sub-mirror support member which supports a sub-mirror and is supported to be rotatable relative to the main-mirror support member about a second axis which is substantially parallel to the first axis and is positioned in a jutting-out position, in which the sub-mirror juts from the main mirror in the photographing optical path, when the main-mirror support member is in the viewfinder light-guiding position, and which is positioned in a sub-mirror retracted position, in which the sub-mirror is retracted to a back of the main mirror, when the main-mirror support member is in the retracted position; a first shock-absorbing member which is held in a first shock-absorbing stand-by position by a first biaser, the first shock-absorbing member coming into contact with the main-mirror support member and being pressed and moved thereby against a biasing force of the first biaser to absorb shock of the main-mirror support member when the main-mirror support member rotates from the viewfinder light-guiding position to the retracted position; a second shock-absorbing member which is held in a second shock-absorbing stand-by position by a second biaser, the second shock-absorbing member coming into contact with the main-mirror support member and being pressed and moved thereby against a biasing force of the second biaser to absorb shock of the main-mirror support member when the main-mirror support member rotates from the retracted position to the viewfinder light-guiding position; and a third shock-absorbing member which is held in a third shock-absorbing stand-by position by a third biaser, the third shock-absorbing member coming into contact with the sub-mirror support member and being pressed and moved thereby against a biasing force of the third biaser to absorb shock of the sub-mirror support member when the sub-mirror support member rotates from the jutting-out position to the sub-mirror retracted position in association with rotation of the main-mirror support member to the retracted position. When the main-mirror support member is in the retracted position, the first shock-absorbing member is held in a non-contact position with respect to the main-mirror support member by the second shock-absorbing member positioned in the second shock-absorbing stand-by position. When the sub-mirror support member is in the sub-mirror retracted position, the third shock-absorbing member is held in a non-contact position with respect to the sub-mirror support member by the first shock-absorbing member.

In an embodiment, a movable-mirror drive mechanism of a camera is provided, including a main-mirror support member which supports a main mirror and is supported to be rotatable about a first axis between a mirror-down position, in which the main mirror is positioned in a photographing optical path, and a mirror-up position, in which the main mirror is retracted from the photographing optical path; a sub-mirror support member which supports a sub-mirror and is supported to be rotatable relative to the main-mirror support member about a second axis which is substantially parallel to the first axis and is positioned in a jutting-out position, in which the sub-mirror juts from the main mirror in the photographing optical path, when the main-mirror support member is in the mirror-down position, and which is positioned in a retracted position, in which the sub-mirror is retracted to a back of the main mirror, when the main-mirror support member is in the mirror-up position; a main-mirror shock-absorbing member which is held in a main-mirror shock-absorbing stand-by position by a main-mirror shock-absorbing biaser, the main-mirror shock-absorbing member coming into contact with the main-mirror support member and being pressed and moved thereby against a biasing force of the main-mirror shock-absorbing biaser to absorb shock of the main-mirror support member when the main-mirror support member rotates from the mirror-up position to the mirror-down position; and a sub-mirror shock-absorbing member which is held in a sub-mirror shock-absorbing stand-by position by a sub-mirror shock-absorbing biaser, the sub-mirror shock-absorbing member coming into contact with the sub-mirror support member and being pressed and moved thereby against a biasing force of the sub-mirror shock-absorbing biaser to absorb shock of the sub-mirror support member when the sub-mirror support member rotates from the retracted position to the jutting-out position in association with rotation of the main-mirror support member to the mirror-down position. The main-mirror shock-absorbing member includes a press portion which comes into contact with the sub-mirror shock-absorbing member and presses and moves the sub-mirror shock-absorbing member to disengage the sub-mirror shock-absorbing member from the sub-mirror support member in a state where at least the main-mirror support member is in the mirror-down position.

According to the invention claimed in claim 1, the first shock-absorbing member, which suppresses bouncing of the main-mirror support member when the main-mirror support member rotates to the viewfinder light-guiding position, and the third shock-absorbing member, which suppresses bouncing of the sub-mirror support member when the sub-mirror support member rotates to the jutting-out position, are held in a non-contact position with respect to the main-mirror support member and the sub-mirror support member in a state where the main-mirror support member and the sub-mirror support member has reached the viewfinder light-guiding position and the jutting-out position, respectively, the positions of the main mirror and the sub-mirror can be set with high precision without being influenced by the first shock-absorbing member and the third shock-absorbing member, respectively. In addition, the second shock-absorbing member, which takes charge of absorbing bouncing of the main-mirror support member when the main-mirror support member rotates to the retracted position, also serves as a device which holds the first shock-absorbing member in a non-contact position with respect to the main-mirror support member, and the first shock-absorbing member, which takes charge of absorbing bouncing of the main-mirror support member when the main-mirror support member rotates to the viewfinder light-guiding position, also serves as a device which holds the third shock-absorbing member in a non-contact position with respect to the sub-mirror support member, which reduces the number of components of the movable-mirror drive mechanism and thus simplifies the structure thereof, making it possible to achieve a reduction in size and cost of the camera.

According to the invention claimed in claim 7, in which the viewfinder light-guiding position and the retracted position of the main-mirror support member are inversed and the jutting-out position and the sub-mirror retracted position of the sub-mirror support member are inversed, effects similar to those obtained in the movable-mirror drive mechanism claimed in claim 1 can also be obtained.

According to the invention claim in claim 8, since the main-mirror shock-absorbing member also serves as a device for controlling the position of the sub-mirror shock-absorbing member when the main-mirror support member is in the mirror-down position, a reduction in the number of components and simplification of the structure can be achieved compared with the case where the position control for the sub-mirror shock-absorbing member is performed using a different independent member.

The present disclosure relates to subject matter contained in Japanese Patent Application No. 2013-164930 (filed on Aug. 8, 2013) which is expressly incorporated herein by reference in its entirety.

BRIEF DESCRIPTION OF THE DRAWINGS

The present invention will be described below in detail with reference to the accompanying drawings in which.

DESCRIPTION OF THE EMBODIMENT

Figure 1:
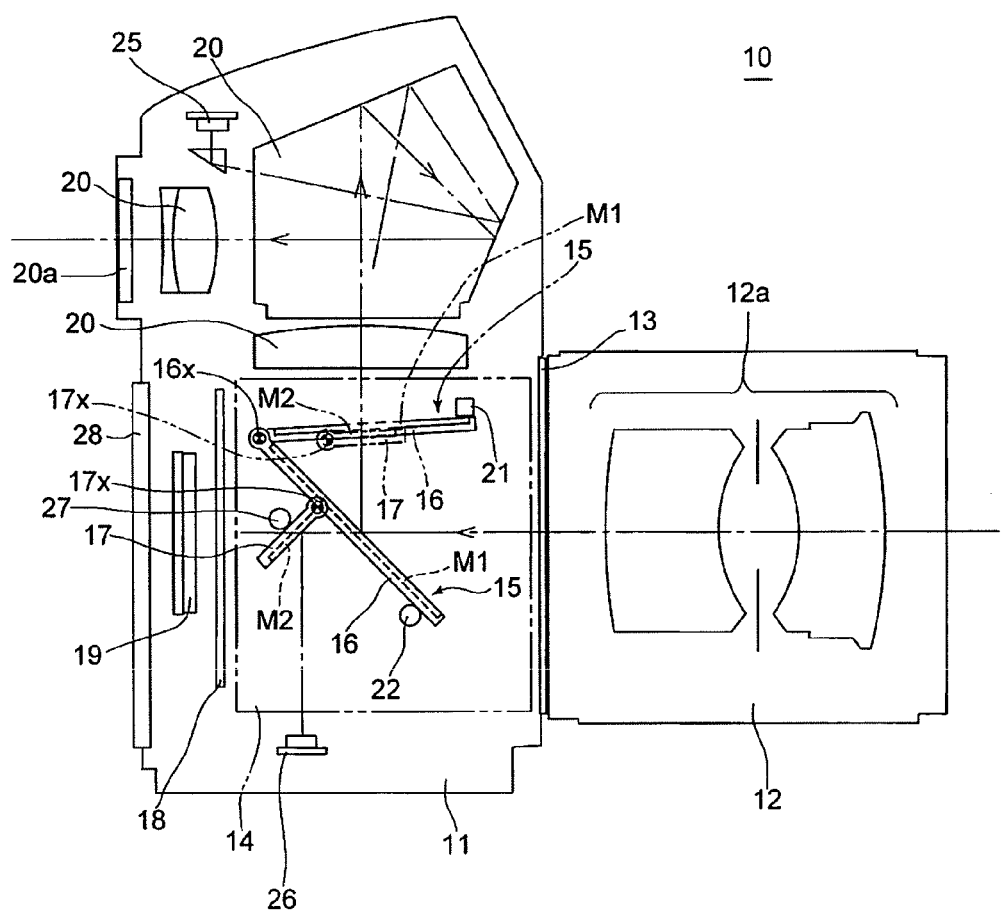
FIG. 1 is a diagram showing a schematic representation of the optical system of an SLR camera according to the present invention.
Figure 2:
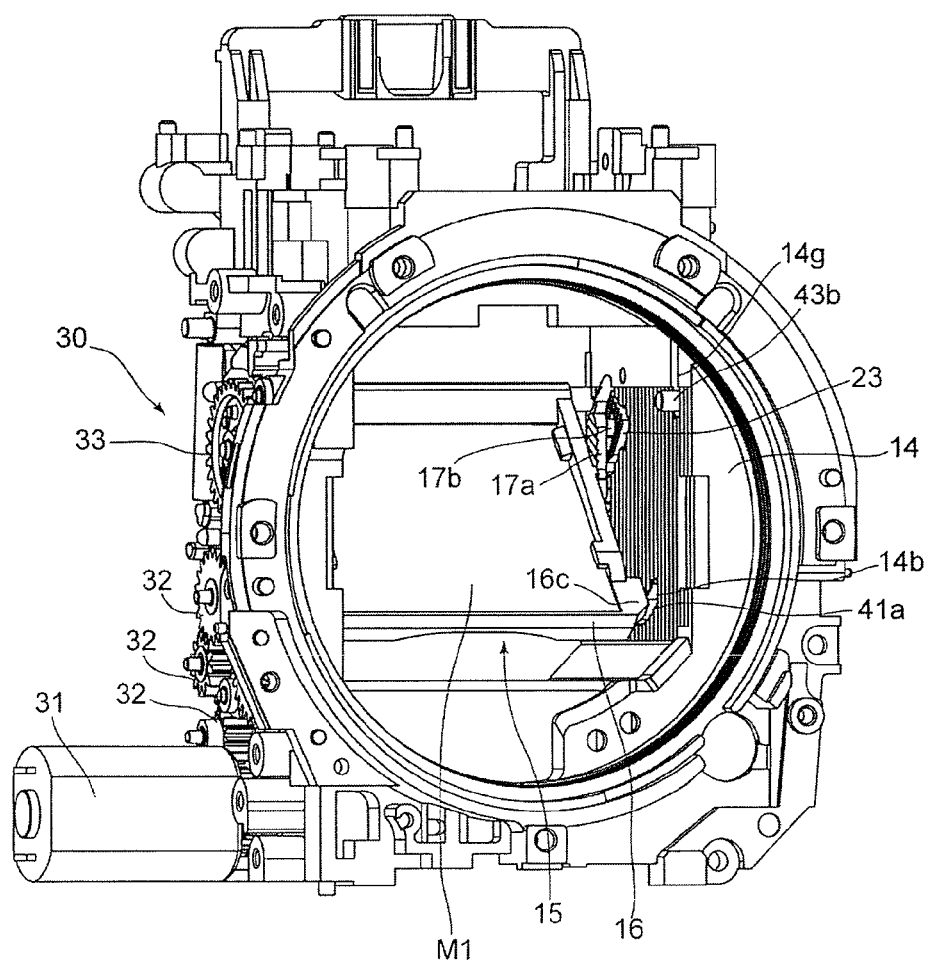
FIG. 2 is a front perspective view of a mirror box unit of the SLR camera in a mirror-down state.

An SLR camera (hereinafter referred simply to as camera) 10 shown in FIG. 1 is provided on the front of a camera body 11 with a lens mount 13, to which an interchangeable lens 12 is detachably attached. The camera 10 is provided, in the camera body 11 behind the lens mount 13, with a mirror box 14. The camera body 11 is provided inside the mirror box 14 with a movable mirror (quick-return mirror) 15. The movable mirror 15 is provided with a main mirror M1 (see FIGS. 1, 2, 6 and 8) and a sub-mirror M2 (see FIG. 1) and is further provided with a main mirror seat (main-mirror support member) 16 and a sub-mirror seat (sub-mirror support member) 17 which support the main mirror M1 and the sub-mirror M2, respectively. The main mirror seat 16 is in the shape of a frame which surrounds the rectangular main mirror M1, and a pair of main-mirror support shafts (first axis) 16x which project in laterally opposite directions from laterally both sides of the main mirror seat 16 are rotatably supported by both side walls of the mirror box 14, respectively. The camera body 11 is provided behind the movable mirror 15 with a focal plane shutter (hereinafter referred to as simply a shutter) 18, and is provided behind the shutter 18 with an image sensor (photographic light-receiving medium) 19. The camera body 11 is provided above the movable mirror 15 with a viewfinder optical system 20 configured of a pentagonal prism and an eyepiece, etc. The present embodiment of the camera 10 is a digital camera using the image sensor 19 as a photographic light-receiving medium; however, the present invention can also be applied to a camera using silver-salt film as a photographic light-receiving medium.

Figure 4:
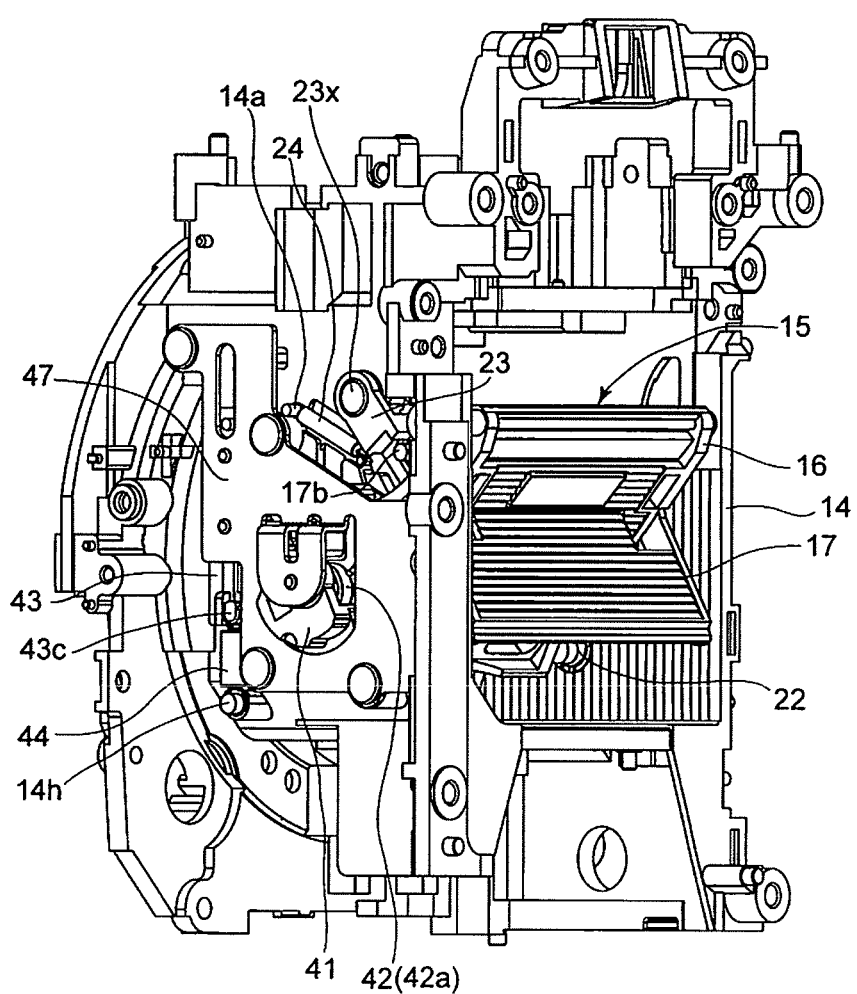
FIG. 4 is a rear perspective view of the mirror box unit in the mirror-down state.
Figure 5:
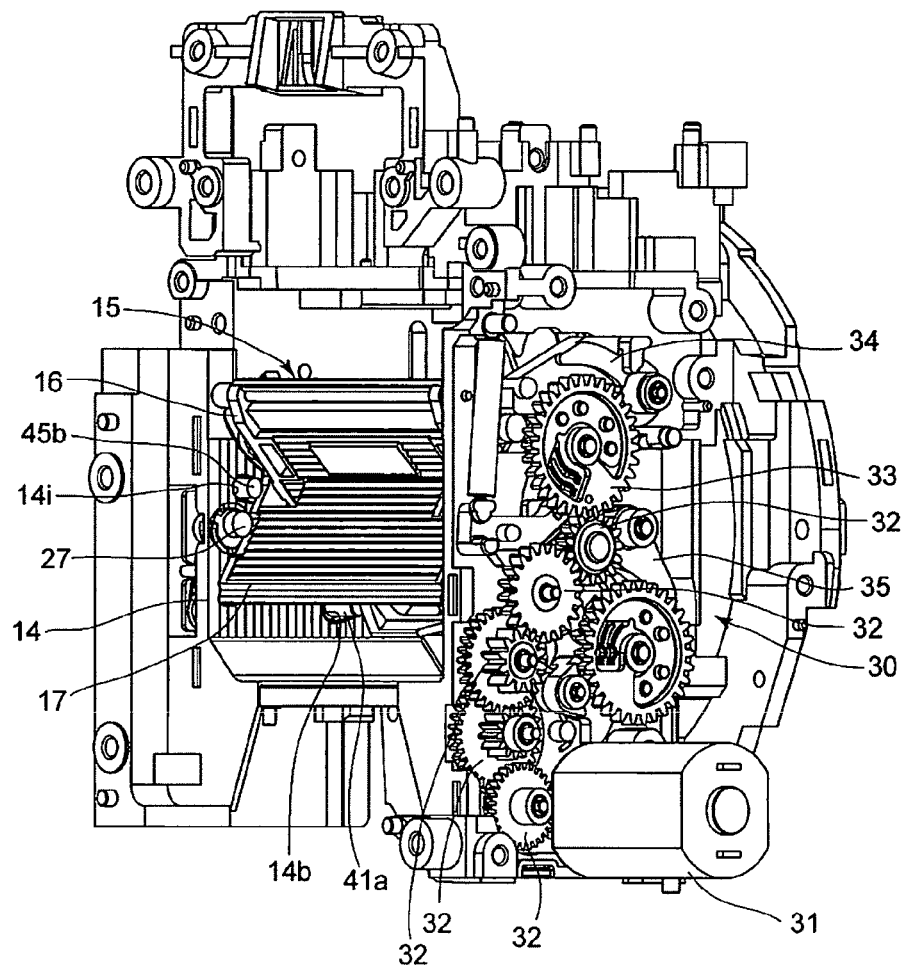
FIG. 5 is a rear perspective view of the mirror box unit in the mirror-down state, viewed from a different angle.
Figure 6:
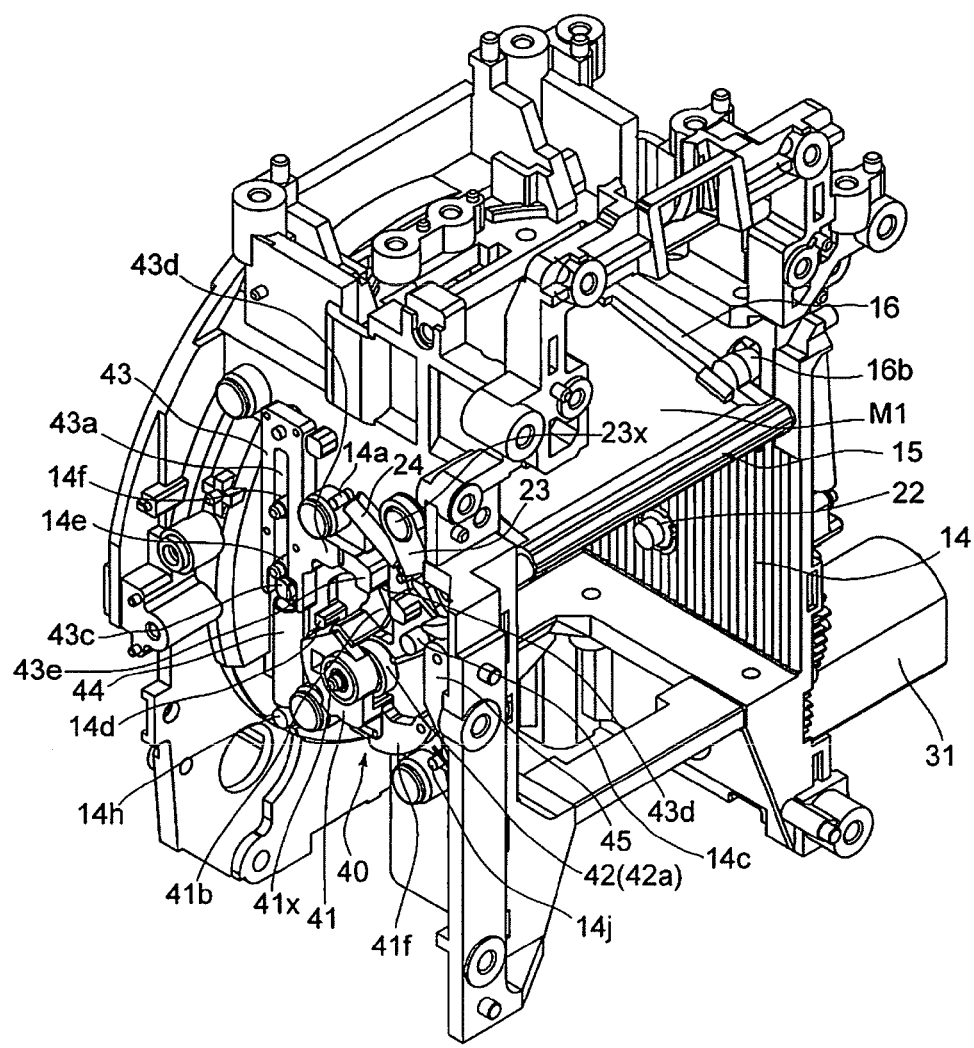
FIG. 6 is a rear perspective view of the mirror box unit in the mirror-up state.

The main mirror seat 16 reciprocatively rotates (swings) about the pair of main-mirror support shafts 16x between a mirror-down position (viewfinder light-guiding position; shown by solid lines in FIG. 1 and also shown in FIGS. 2, 4, 5, 7 and 10), in which the main mirror M1 is positioned in a photographing optical path (which extends from a photographing lens system 12a provided in the interchangeable lens 12 to the image sensor 19) to be inclined at an angle of approximately 45 degrees with respect to the photographing optical path, and a mirror-up position (retracted position; shown by two-dot chain lines in FIG. 1 and also shown in FIGS. 3, 6, 8 and 12), in which the main mirror M1 is retracted upward from the photographing optical path. As shown in FIGS. 4 and 6, a mirror-down position defining pin (main-mirror positioning portion) 22 projects inside the mirror box 14 from an inner surface of one of the side walls of the mirror box 14 that are positioned on laterally both sides of the movable mirror 15, and the mirror-down position of the main mirror seat 16 is defined by engagement of the mirror-down position defining pin 22 with a stopper 16a (see FIGS. 7 and 8) formed on a side of the main mirror seat 16. The mirror-down position defining pin 22 is formed as an eccentric pin, and the position of the mirror-down position defining pin 22 can be adjusted by rotating the mirror-down position defining pin 22 relative to the mirror box 14. In addition, an upper stopper 21 is fixedly installed inside the mirror box 14. An upper surface of the main mirror seat 16 comes into contact with the upper stopper 21 when the main mirror seat 16 rotates to the mirror-up position.

Figure 7:
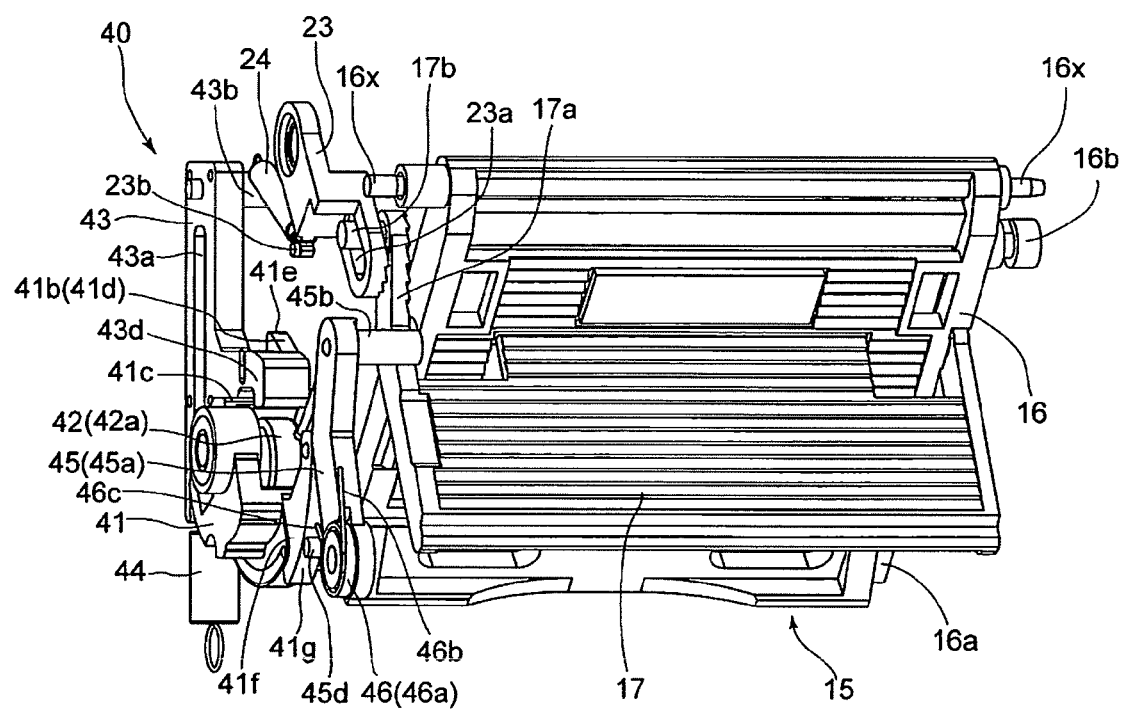
FIG. 7 is a perspective view of a mirror bounce-suppressing mechanism of the SLR camera in the mirror-down state.
Figure 8:
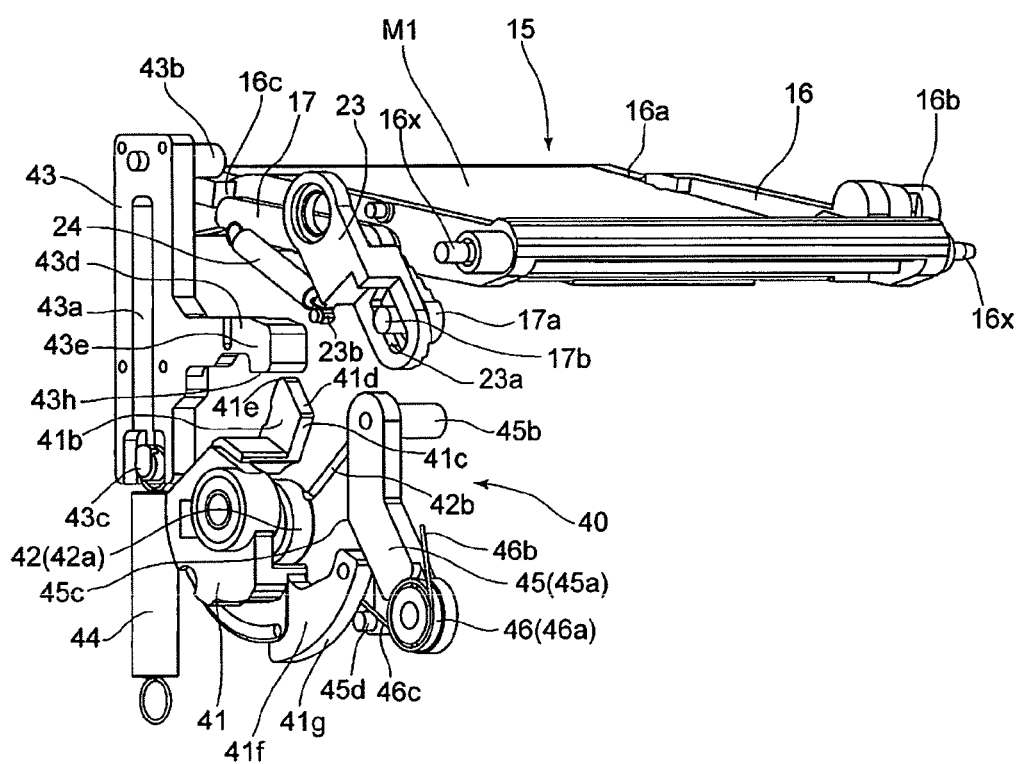
FIG. 8 is a perspective view of the mirror bounce-suppressing mechanism in the mirror-up state.
Figure 9:
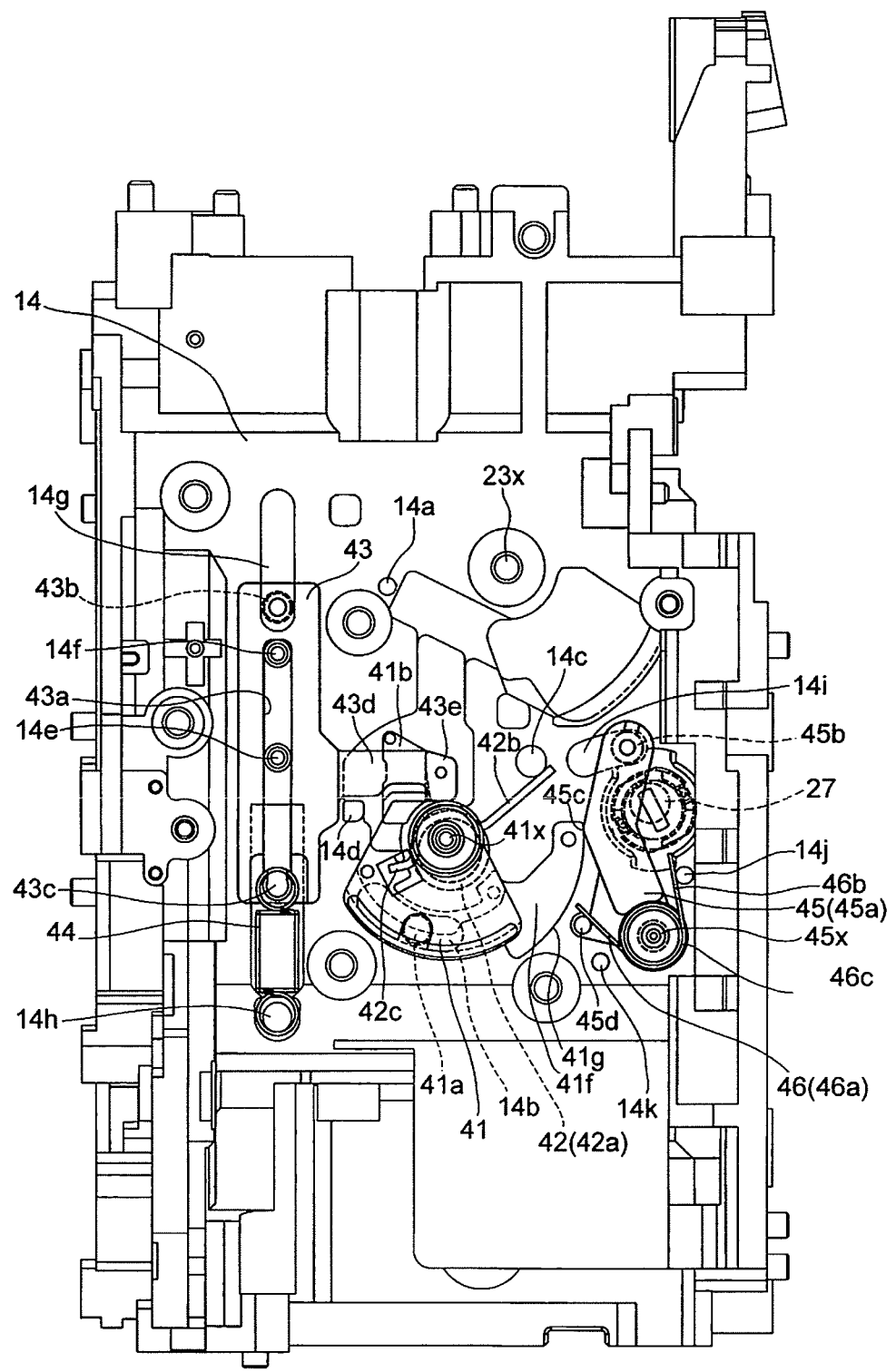
FIG. 9 is a left side elevational view of the mirror box unit with a retaining plate removed to expose the mirror bounce-suppressing mechanism.

The sub-mirror seat 17 is pivoted at both lateral sides of the main mirror seat 16 about a pair of sub-mirror support shafts (second axis) 17x which project in laterally opposite directions from both lateral sides of the sub-mirror seat 17 so that the pair of sub-mirror support shafts 17x are parallel to the pair of main-mirror support shafts 16x. As shown in FIGS. 7 and 8, the sub-mirror seat 17 is provided on a side thereof with an extension arm 17a that extends in a direction eccentric from the pivoted position at the pair of sub-mirror support shafts 17x, and the sub-mirror seat 17 is further provided with a linkage pin 17b which projects laterally from a portion of the extension arm 17a in the close vicinity of the free end thereof. The sub-mirror seat 17 is linked with the main mirror seat 16 via a linkage lever 23. The linkage lever 23 is supported by a side of the mirror box 14 to be rotatable about a linkage lever support shaft 23x (see FIGS. 4 and 6), the axis of which is parallel to the pair of main-mirror support shafts 16x and the pair of sub-mirror support shafts 17x. An arc-shaped linkage hole 23a which is elongated in a radial direction of the linkage lever support shaft 23x is formed in the linkage lever 23, and the linkage pin 17b of the sub-mirror seat 17 is inserted into the linkage hole 23a to be movable therein. The camera body 11 is provided therein with a linkage-lever biasing spring 24, one end and the other end of which are hooked onto a spring hook 23b of the linkage lever 23 and a spring hook 14a of the mirror box 14, respectively. The linkage-lever biasing spring 24 is an extension coil spring and biases and rotates the linkage lever 23 clockwise with respect to FIGS. 9 through 15 (note that the linkage lever 23 is not shown in FIGS. 9 through 15).

As shown in FIG. 1, object-emanated light which enters the mirror box 14 through the photographing lens system 12a in the interchangeable lens 12, with the interchangeable lens 12 mounted to the lens mount 13, is reflected by the main mirror M1 to be incident on the viewfinder optical system 20 and observable through a viewfinder window 20a formed in the back of the camera body 11. In this state, a photometering operation using a photometering unit 25 which is installed behind the pentagonal prism of the viewfinder optical system 20 can be carried out. In addition, when the main mirror seat 16 is in the mirror-down position, the linkage hole 23a of the linkage lever 23 that is biased by the linkage-lever biasing spring 24 presses the linkage pin 17b, so that the sub-mirror seat 17 projects obliquely downwards (obliquely rearwards) from the underside of the main mirror seat 16 (see FIGS. 4, 5, 7 and 10). The main mirror M1 is made as a half-silvered mirror (pellicle mirror); accordingly, when the main mirror M1 is in the mirror-down position, the sub-mirror M2 on the sub-mirror seat 17 reflects part of the object-emanated light, which is passed through the main mirror M1, downward to be incident on a distance measuring unit 26 installed in a lower part the mirror box 14, which makes it possible to detect an object distance (to detect an in-focus state). As shown in FIG. 5, a second position defining pin (sub-mirror positioning portion) 27 projects inside the mirror box 14, and the position of the sub-mirror seat 17 when the main mirror seat 16 is in the mirror-down position is defined by engagement of the sub-mirror seat 17 with the second position defining pin 27. The second position defining pin 27 is formed as an eccentric pin, and the position of the second position defining pin 27 can be adjusted by rotating the second position defining pin relative to the mirror box 14. The position of the sub-mirror seat 17 (the sub-mirror M2) that is defined by engagement with the second position defining pin 27 will be hereinafter referred to as the jutting-out position.

On the other hand, when the main mirror seat 16 is in the mirror-up position, the main mirror M1 is retracted upward from the photographing optical path. Upon the main mirror seat 16 rotating in the direction toward the mirror-up position, the force of the linkage lever 23 which presses the linkage pin 17*b* by the biasing force of the linkage-lever biasing spring 24 acts as a force which brings the sub-mirror seat 17 to rotate about the pair of sub-mirror support shafts 17*x* in the clockwise direction with respect to FIGS. 10 through 15, and the sub-mirror seat 17 is held by the linkage lever 23 and the linkage-lever biasing spring 24 in a state of being overlaid on a lower surface (underside) of the main mirror seat 16 (see FIGS. 3, 8 and 12). Consequently, the sub-mirror M2 is also retracted upward from the photographing optical path. Accordingly, in the mirror-up state, in which the main mirror seat 16 is in the mirror-up position, the object-emanated light which enters the mirror box 14 through the photographing lens system 12*a* travels toward the shutter 18 without being reflected or blocked by the main mirror M1 or the sub-mirror M2, thus being capable of being made incident on the light receiving surface of the image sensor 19 by the opening of the shutter 18. The position of the sub-mirror seat 17 (the sub-mirror M2) when the main mirror seat 16 is in the mirror-up position will be hereinafter referred to as the retracted position (sub-mirror retracted position). Electronic object images obtained via the image sensor 19 and various other information can be displayed on an LCD monitor 28 (see FIG. 1) provided on the back of the camera body 11.

Figure 3:
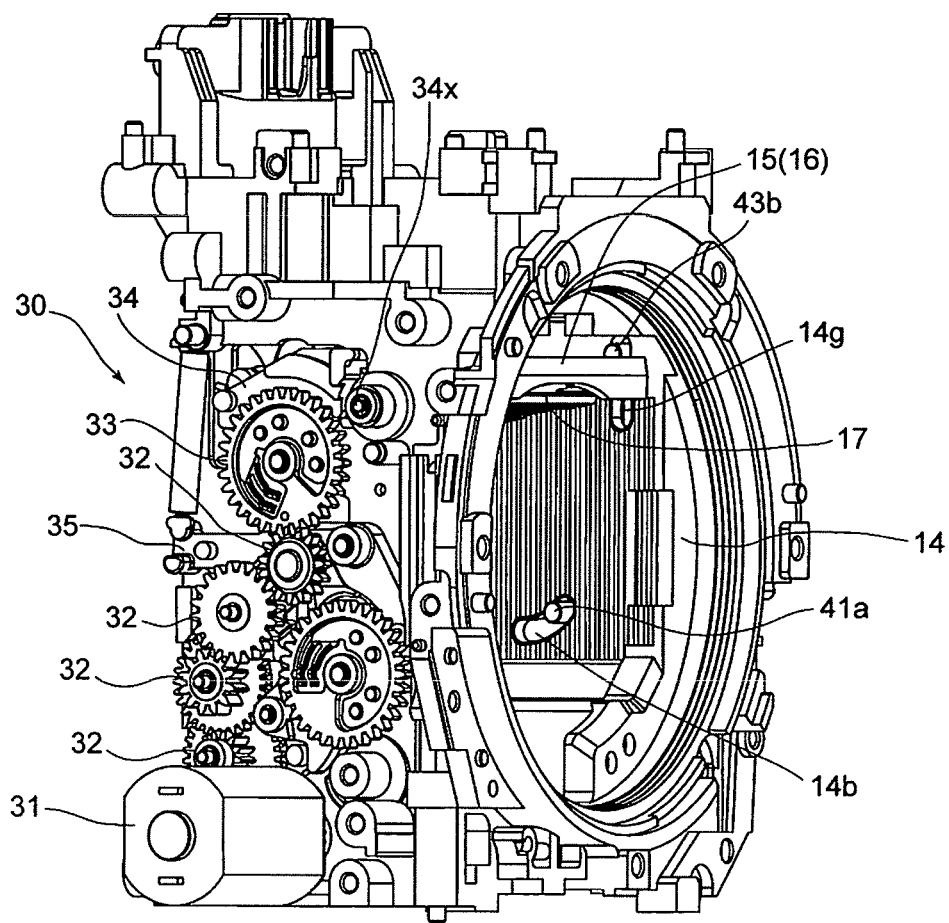
FIG. 3 is a front perspective view of the mirror box unit in a mirror-up state.

As shown in FIGS. 3 and 5, the camera body 11 is provided with a mirror drive mechanism 30, on a side (left side as viewed from front) of the mirror box 14, which rotatably drives the movable mirror 15 upward and downward. The mirror drive mechanism 30 is provided with a motor 31, a reduction gear train 32 which transmits a driving force of the motor 31, a cam gear 33 to which the rotational driving force is transmitted from the reduction gear train 32 via a planetary gear mechanism, and a mirror drive lever 34, the rotational position of which is controlled by the cam gear 33. The mirror drive lever 34 is supported by the mirror box 14 to be reciprocatively rotatable (swingable) about an axis 34*x* (see FIG. 3) which is substantially parallel to the axis of the pair of main-mirror support shafts 16*x*. The mirror drive lever 34 holds a mirror seat boss 16*b* (see FIGS. 6 through 8) which is formed on a side of the main mirror seat 16. Pressing the mirror seat boss 16*b* downward by a holding portion of the mirror drive lever 34 that holds the mirror seat boss 16*b* causes the main mirror seat 16 to rotate downward, toward the mirror-down position, and pressing the mirror seat boss 16*b* upward by the same holding portion causes the main mirror seat 16 to rotate upward, toward the mirror-up position. The mirror drive lever 34 is biased to rotate by a biaser (not shown) in a direction to press the main mirror seat 16 toward the mirror-down position. When the cam gear 33 is located at a specific rotational position, the mirror drive lever 34 is pressed and rotated toward the mirror-up position against the biasing force of the aforementioned biaser by a mirror control cam (peripheral surface cam) formed on the cam gear 33. More specifically, the cam gear 33 is a single-rotation cam gear which is rotated only in one direction from an initial position. When the cam gear 33 is in the initial position, the mirror control cam of the cam gear 33 does not press the mirror drive lever 34, so that the main mirror seat 16 is held in the mirror-down position by the biasing force of the aforementioned biaser that acts on the mirror drive lever 34. A rotation of the cam gear 33 partway from the initial position causes the mirror control cam of the cam gear 33 to press and rotate the mirror drive lever 34, which causes the mirror drive lever 34 to rotate the main mirror seat 16 to the mirror-up position. By the time the cam gear 33 reverts to the initial position (via rotation of the cam gear 33 in a single direction) from this partway position, the mirror control cam of the cam gear 33 releases the pressure against the mirror drive lever 34, so that the main mirror seat 16 returns to the mirror-down position.

The camera body 11 is further provided on the left side of the mirror box 14, to which the mirror drive mechanism 30 is installed, with a shutter charge lever 35 which makes the shutter 18 perform a shutter charge operation. In addition to the aforementioned mirror control cam, the cam gear 33 is further provided with a shutter charge cam for controlling the operation of the shutter charge lever 35. One rotation of the cam gear 33 from the initial position causes the shutter charge lever 35 to reciprocatively rotate to make the shutter 18 perform the shutter charge operation. The shutter charge operation is not related to the features of the present invention, and therefore the detailed description of the shutter charge operation is omitted in the following description.

The camera 10 is provided on the other side of the mirror box 14 (the right side of the mirror box 14 as viewed from the front) with a mirror bounce-suppressing mechanism 40 which absorbs shock of the main mirror seat 16 and the sub-mirror seat 17 that is caused upon rotation of the movable mirror 15 to the mirror-down position or the mirror-up position to reduce bouncing (vibration) of the entire movable mirror 15. The mirror bounce-suppressing mechanism 40 is provided with a mirror-down shock-absorbing lever (first shock-absorbing member/main-mirror shock absorbing member) 41, a mirror-down shock-absorbing spring (first biaser/main-mirror shock-absorbing biaser) 42, a mirror-up shock-absorbing lever (second shock-absorbing member) 43, a mirror-up shock-absorbing spring (second biaser) 44, a sub-mirror shock-absorbing lever (sub-mirror shock-absorbing member) 45 and a sub-mirror shock-absorbing spring (third biaser/sub-mirror shock-absorbing biaser) 46. The mirror-down shock-absorbing lever 41, the mirror-down shock-absorbing spring 42, the mirror-up shock-absorbing lever 43, the mirror-up shock-absorbing spring 44, the sub-mirror shock-absorbing lever 45 and the sub-mirror shock-absorbing spring 46 are retained so as not to come off the mirror box 14 by a retaining plate 47 (see FIG. 4) fixed to a side of the mirror box 14.

The mirror-down shock-absorbing lever 41 is rotatably supported by a shaft 41*x* which projects from the mirror box 14 in a direction substantially parallel to the pair of main-mirror support shafts 16*x* and the pair of sub-mirror support shafts 17*x*. The mirror-down shock-absorbing lever 41 is substantially in the shape of a sector with its axis of curvature coincident with the shaft 41*x*. The mirror-down shock-absorbing lever 41 is provided with a shock-absorbing pin (projection) 41*a* which projects into the inside of the mirror box 14 at a position in the close vicinity of the outer edge of the sector. A circular-arc-shaped through-hole 14*b* (the profile of which is centered about the shaft 41*x*) is formed through the mirror box 14, and the shock-absorbing pin 41*a* of the mirror-down shock-absorbing lever 41 projects into the inside of the mirror box 14 through the through-hole 14*b* (see FIGS. 2, 3, 5 and 9). The shock-absorbing pin 41*a* lies in the rotational movement path of a shock-absorbing contact portion 16*c* which is formed on a side of the main mirror seat 16 in the close vicinity of the free end thereof (lies in the rotational movement path of the main mirror seat 16 about the pair of main-mirror support shafts 16*x*) to be capable of coming into contact with the lower surface of the shock-absorbing contact portion 16*c*.

The mirror-down shock-absorbing lever 41 is provided in the vicinity of the pivoted part thereof with a control arm 41b which projects radially outwards away from the shaft 41x. As shown in FIG. 8, the control arm 41b is provided on one side thereof with a rotation-restricting surface 41c, and provided at a position adjoining to the rotation-restricting surface 41c with an inclined cam surface 41d. The rotation-restricting surface 41c is a surface which extends in a substantially radial direction of the shaft 41x, and the inclined cam surface 41d is inclined to the rotational direction of the mirror-down shock-absorbing lever 41. More specifically, the inclined cam surface 41d is a surface which is inclined in a direction to be increasingly distant from the shaft 41x in a direction away from the boundary between the inclined cam surface 41d and the rotation-restricting surface 41c and in a forward direction (with respect to the camera body 11). The control arm 41b is provided, at an end (tip) thereof which is continuous with the inclined cam surface 41d, with a downward movement restricting convex portion 41e.

The mirror-down shock-absorbing lever 41 is further provided with a press piece 41f which projects from an outer edge, of the sector shaped part of the mirror-down shock-absorbing lever 41, which is spaced apart from the shaft 41x. The press piece 41f projects toward the rear of the mirror box 14 (in a direction to approach the shutter 18) and is provided on the outer edge thereof with a circular-arc-shaped press surface 41g with the curvature center thereof on the axis of the shaft 41x.

Figure 10:
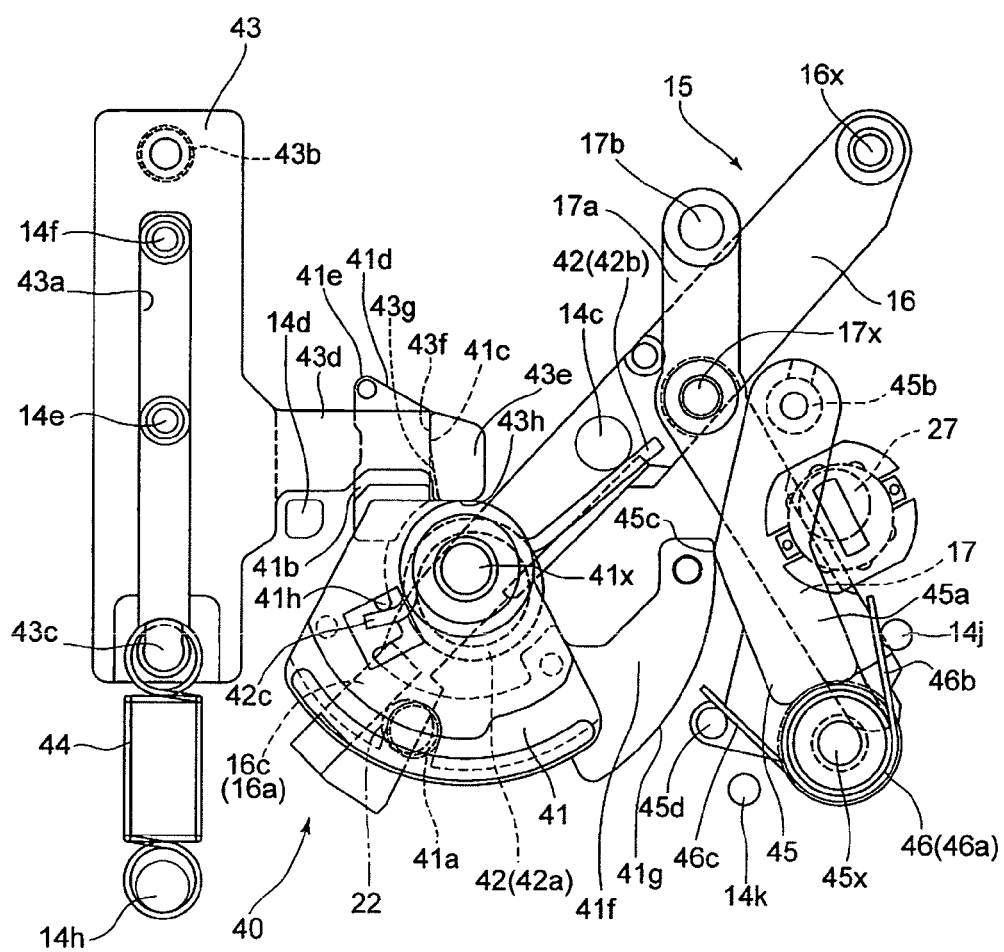
FIG. 10 is a side elevational view of the mirror bounce-suppressing mechanism in the mirror-down state.

The mirror-down shock-absorbing spring 42 is a torsion spring which is provided with a coil portion 42a, a spring arm portion 42b and a spring arm portion 42c. The coil portion 42a surrounds the shaft 41x, the spring arm portion 42b is engaged with a spring hook 14c formed on a side of the mirror box 14, and the spring arm portion 42c is engaged with a spring hook 41h formed on the mirror-down shock-absorbing lever 41. The mirror-down shock-absorbing lever 41 is biased clockwise with respect to FIGS. 9 through 15 by the mirror-down shock-absorbing spring 42. The direction of biasing the mirror-down shock-absorbing lever 41 by the mirror-down shock-absorbing spring 42 is a direction which brings the shock-absorbing pin 41a close to (to bring into contact with) the shock-absorbing contact portion 16c of the main mirror seat 16, and a rotational limit projection (first stopper) 14d which defines a rotational limit of the mirror-down shock-absorbing lever 41 in the aforementioned basing direction is formed on a side of the mirror box 14. This rotational limit of the mirror-down shock-absorbing lever 41, in which the mirror-down shock-absorbing lever 41 comes in contact with the rotational limit projection 14d, will be hereinafter referred to as the first shock-absorbing standby position (main-mirror shock-absorbing standby position) (see FIGS. 12 through 14). The mirror-down shock-absorbing lever 41 is rotatable in a direction away from the rotational limit projection 14d (the counterclockwise direction with respect to FIGS. 9 through 15) against the biasing force of the mirror-down shock-absorbing spring 42 with the first shock-absorbing standby position as one of the two rotational limits of the mirror-down shock-absorbing lever 41. Until reaching a predetermined position (corresponding to the mirror-down position of the main mirror seat 16) with the first shock-absorbing standby position as a starting point, the mirror-down shock-absorbing lever 41 is rotated against the biasing force of the mirror-down shock-absorbing spring 42 while being pressed by the shock-absorbing contact portion 16c of the main mirror seat 16 rotating toward the mirror-down position. Upon the main mirror seat 16 reaching the mirror-down position, the stopper 16a of the main mirror seat 16 comes into contact with the mirror-down position defining pin 22 to thereby prevent the main mirror seat 16 from rotating further, so that no more pressing force is exerted on the mirror-down shock-absorbing lever 41 from the shock-absorbing contact portion 16c. This range of rotation of the mirror-down shock-absorbing lever 41, in which the mirror-down shock-absorbing lever 41 receives a pressing and moving force from the main mirror seat 16, will be hereinafter referred to as the shock-absorbing moving range of the mirror-down shock-absorbing lever 41. The mirror-down shock-absorbing lever 41 can further rotate into an overrun range which exceeds this shock-absorbing moving range. FIG. 10 shows a state where the mirror-down shock-absorbing lever 41 is in the overrun range. In this state, the main mirror seat 16 is prevented from rotating further from the mirror-down position by engagement with the mirror-down position defining pin 22, whereas the mirror-down shock-absorbing lever 41 is disengaged at the shock-absorbing pin 41a thereof from the shock-absorbing contact portion 16c of the main mirror seat 16, thus being released from the contact engagement with the main mirror seat 16. In the overrun range, the mirror-down shock-absorbing lever 41 can rotate further in the counterclockwise direction from the position shown in FIG. 10.

The mirror-up shock-absorbing lever 43 is provided with a guide hole 43a into which an upper and lower pair of guide pins (second stopper) 14e and 14f, which are formed to project from one side of the mirror box 14, are inserted. The mirror-up shock-absorbing lever 43 is supported to be linearly movable in the vertical direction by the guiding of the guide hole 43a by the pair of guide pins 14e and 14f. This linear moving direction of the mirror-up shock-absorbing lever 43 is set in a plane substantially orthogonal to the axis of the shaft 41x of the mirror-down shock-absorbing lever 41. In other words, the mirror-down shock-absorbing lever 41 and the mirror-up shock-absorbing lever 43 are supported to be movable and rotatable in their respective planes parallel to each other. The mirror-up shock-absorbing lever 43 is provided in the vicinity of the upper end thereof with a shock-absorbing pin (projection) 43b which projects into the inside of the mirror box 14. The mirror-up shock-absorbing lever 43 is provided in the vicinity of the lower end thereof with a spring hook 43c. The mirror box 14 is provided with a through-hole 14g which is elongated in the vertical direction, and the shock-absorbing pin 43b of the mirror-up shock-absorbing lever 43 projects into the inside of the mirror box 14 through the through-hole 14g (see FIGS. 2, 3 and 9). The shock-absorbing pin 43b lies in the rotational movement path of the shock-absorbing contact portion 16c of the main mirror seat 16 (lies in the rotational movement path of the main mirror seat 16 about the pair of main-mirror support shafts 16x) to be capable of coming into contact with the upper surface of the shock-absorbing contact portion 16c.

The mirror-up shock-absorbing lever 43 is provided with a side arm 43d which projects from one side of the mirror-up shock-absorbing lever 43. The side arm 43d projects in a direction substantially orthogonal to the vertical direction that corresponds to the moving direction of the mirror-up shock-absorbing lever 43. The side arm 43d is provided at the free end thereof with a thick end-portion (rotation-restricting portion) 43e having a hook-like shape which bends downward. The thick end-portion 43e is provided with a rotation-restricting surface (rotation-restricting portion) 43f, an inclined cam surface 43g and a downward movement restricting surface 43h (see FIGS. 10 through 15). The rotation-restricting surface 43f and the inclined cam surface 43g are surfaces which are formed to be continuous with each other and face the main body of the mirror-up shock-absorbing lever 43 that includes the guide hole 43a. The rotation-restricting surface 43f is formed as a surface that is substantially parallel to the moving direction of the mirror-up shock-absorbing lever 43, and the inclined cam surface 43g is formed as a surface which is inclined to the linear moving direction of the mirror-up shock-absorbing lever 43. More specifically, the inclined cam surface 43g is formed as a surface which is inclined in a direction that is increasingly distant from the main body of the mirror-up shock-absorbing lever 43 (i.e., in a direction to approach the free end of the side arm 43d) in the downward direction away from the boundary between the inclined cam surface 43g and the rotation-restricting surface 43f. The downward movement restricting surface 43h is a flat surface which faces downward, is formed continuous with the inclined cam surface 43g and extends substantially orthogonal to the moving direction of the mirror-up shock-absorbing lever 43. The rotation-restricting surface 43f, the inclined cam surface 43g and the downward movement restricting surface 43h lie in a plane in which the control arm 41b of the mirror-down shock-absorbing lever 41 lies, so that the control arm 41b and the thick end-portion 43e can be made to come into contact with each other in accordance with the relative positional relationship between the mirror-down shock-absorbing lever 41 and the mirror-up shock-absorbing lever 43.

The mirror-up shock-absorbing spring 44 is configured from an extension spring (extension coil spring). The mirror-up shock-absorbing spring 44 is hooked at one end and the other end thereof onto the spring hook 43c, which is formed on the mirror-up shock-absorbing lever 43, and a spring hook 14h which is formed on a side of the mirror box 14, respectively, to bias the mirror-up shock-absorbing lever 43 downward. This direction of biasing the mirror-up shock-absorbing lever 43 by the mirror-up shock-absorbing spring 44 is a direction which brings the shock-absorbing pin 43b close to (and to bring into contact with) the shock-absorbing contact portion 16c of the main mirror seat 16, and the engagement of the upper end of the guide hole 43a with the guide pin 14f prevents the mirror-up shock-absorbing lever 43 from moving further in the biasing direction of the mirror-up shock-absorbing spring 44. This movement limit of the mirror-up shock-absorbing lever 43 in the biasing direction of the mirror-up shock-absorbing spring 44 (in the downward direction) will be hereinafter referred to as the second shock-absorbing standby position. When the mirror-up shock-absorbing lever 43 is in the second shock-absorbing standby position, the thick end-portion 43e of the side arm 43d has moved into the rotational movement path of the control arm 41b about the shaft 41x of the mirror-down shock-absorbing lever 41 and prevents the mirror-down shock-absorbing lever 41 from rotating in the biasing direction of the mirror-down shock-absorbing spring 42 by engagement of the rotation-restricting surface 43f with the rotation-restricting surface 41c (see FIGS. 10 and 11). More specifically, it is possible for the rotation-restricting surface 41c of the mirror-down shock-absorbing lever 41 and the rotation-restricting surface 43f of the mirror-up shock-absorbing lever 43 to face and come in contact with each other only when the mirror-up shock-absorbing lever 43 and the mirror-down shock-absorbing lever 41 are in the second shock-absorbing standby position and the aforementioned overrun range, respectively. Accordingly, the mirror-down shock-absorbing lever 41 is held in the overrun range, in which the shock-absorbing pin 41a is disengaged from the shock-absorbing contact portion 16c of the main mirror seat 16, when the rotation-restricting surface 41c and the rotation-restricting surface 43f are engaged with each other to restrict the rotation of the mirror-down shock-absorbing lever 41.

On the other hand, in a state (shown in FIGS. 12 through 14) where the thick end-portion 43e of the side arm 43d is positioned off the path of rotational movement of the control arm 41b, the holding of the mirror-down shock-absorbing lever in the overrun range is released, which enables the mirror-down shock-absorbing lever 41 to rotate by the mirror-down shock-absorbing spring 42 in the biasing direction thereof (toward the first shock-absorbing standby position). When the mirror-down shock-absorbing lever 41 is in the first shock-absorbing standby position, the control arm 41b has moved into the path of movement of the thick end-portion 43e to prevent the mirror-up shock-absorbing lever 43 from moving in the biasing direction of the mirror-up shock-absorbing spring 44 by engagement of the downward movement restricting convex portion 41e with the downward movement restricting surface 43h (see FIG. 14). In a state where the downward movement restricting convex portion 41e and the downward movement restricting surface 43h are engaged with each other, the mirror-down shock-absorbing lever 41 can rotate in a direction opposite to the biasing direction of the mirror-down shock-absorbing spring 42 (in the counterclockwise direction with respect to FIG. 14).

The sub-mirror shock-absorbing lever 45 is rotatably supported by a shaft 45x which projects from the mirror box 14 in a direction substantially parallel to the pair of main-mirror support shafts 16x and the pair of sub-mirror support shafts 17x. The sub-mirror shock-absorbing lever 45 is provided with an arm 45a which is formed to extend in a substantially radial direction of the shaft 45x of the sub-mirror shock-absorbing lever 45. The sub-mirror shock-absorbing lever 45 is provided in the vicinity of the free end thereof with a shock-absorbing pin (projection) 45b which projects into the inside of the mirror box 14. A circular-arc-shaped through-hole 14i (see FIGS. 5 and 9) about the shaft 45x is formed through the mirror box 14, and the shock-absorbing pin 45b projects into the inside of the mirror box 14 through the through-hole 14i. The shock-absorbing pin 45b lies on the rotational movement path of the sub-mirror 17, and a back surface of the sub-mirror 17 contacts the shock-absorbing pin 45b when the sub-mirror shock-absorbing lever 45 and the sub-mirror 17 have a predetermined positional relationship relative to each other. The shaft 45x that pivots the sub-mirror shock-absorbing lever 45 is positioned closer to the back and the bottom of the mirror box 14 than the shaft 41x that pivots the mirror-down shock-absorbing lever 41, and the arm 45a is extended upward from the axis 45x. The arm 45a has an obtuse V-shape; more specifically, the arm 45a has a bend at its center which protrudes toward the front (the object side) to be positioned in front of a straight line which connects the shaft 45x and the shock-absorbing pin 45b, and the arm 45a is provided at the front of the bend thereof with a front protruded portion 45c.

The sub-mirror shock-absorbing spring 46 is a torsion spring which is provided with a coil portion 46a, a spring arm portion 46b and a spring arm portion 46c. The coil portion 46a surrounds the shaft 45x, the spring arm portion 46b is engaged with a spring hook 14j formed on a side of the mirror box 14, and the spring arm portion 46c is engaged with a spring hook 45d formed on the sub-mirror shock-absorbing lever 45. The sub-mirror shock-absorbing lever 45 is biased counterclockwise with respect to FIGS. 9 through 15 by the sub-mirror shock-absorbing spring 46. The direction of biasing the sub-mirror shock-absorbing lever 45 by the sub-mirror shock-absorbing spring 46 is a direction which brings the shock-absorbing pin 45b close to (and to bring into contact with) the sub-mirror seat 17, and a rotational limit projection (third stopper) 14k which defines a rotational limit of the sub-mirror shock-absorbing lever 45 in the aforementioned basing direction projects from a side of the mirror box 14. This rotational limit of the sub-mirror shock-absorbing lever 45, in which the sub-mirror shock-absorbing lever 45 comes in contact with the rotational limit projection 14k, will be hereinafter referred to as the third shock-absorbing standby position (sub-mirror shock-absorbing standby position) (see FIGS. 12 and 13).

The sub-mirror shock-absorbing lever 45 is rotatable toward the rear of the mirror box 14 (in the clockwise direction with respect to FIGS. 9 through 15) against the biasing force of the sub-mirror shock-absorbing spring 46 with the third shock-absorbing standby position as one of the two rotational limits of the sub-mirror shock-absorbing lever 45. Until reaching a predetermined position (corresponding to the jutting-out position of the sub-mirror seat 17) with the third shock-absorbing standby position (shown in FIGS. 12 and 13) as a starting point, the sub-mirror shock-absorbing lever 45 is rotated against the biasing force of the sub-mirror shock-absorbing spring 46 while the shock-absorbing pin 45b is pressed by the sub-mirror seat 17 rotating toward the jutting-out position. Upon the sub-mirror seat 17 reaching the jutting-out position, the sub-mirror seat 17 comes into contact with the second position defining pin 27 (and is held at the jutting-out position) to thereby prevent the sub-mirror seat 17 from rotating further, so that no more pressing force is exerted on the sub-mirror shock-absorbing lever 45 from the sub-mirror seat 17. This range of rotation of the sub-mirror shock-absorbing lever 45, in which the sub-mirror shock-absorbing lever 45 receives a pressing and moving force from the sub-mirror seat 17, will be hereinafter referred to as the shock-absorbing moving range of the sub-mirror shock-absorbing lever 45. The sub-mirror shock-absorbing lever 45 can further rotate into an overrun range which exceeds this shock-absorbing moving range. FIG. 10 shows a state where the sub-mirror shock-absorbing lever 45 is in the overrun range. In this state, the sub-mirror seat 17 is prevented from rotating further from the jutting-out position by engagement with the second position defining pin 27, whereas the sub-mirror shock-absorbing lever 45 is disengaged at the shock-absorbing pin 45b thereof from the back of the sub-mirror seat 17, thus being released from the contact engagement with the sub-mirror seat 17. In the overrun range, the sub-mirror shock-absorbing lever 45 can rotate further in the clockwise direction from the position shown in FIG. 10.

Operations of the mirror bounce-suppressing mechanism 40 will be hereinafter discussed with reference to FIG. 10 onwards. FIG. 10 shows a state where the movable mirror 15 is in the mirror-down position. In this state, the main mirror seat 16 (the main mirror M1) is held in the mirror-down position with the mirror seat boss 16b pressed downward by the mirror drive lever 34, which serves as a component of the mirror drive mechanism 30, to make the stopper 16a of the main mirror seat 16 abut against the mirror-down position defining pin 22. In addition, the sub-mirror seat 17 (the sub-mirror M2) is held in the jutting-out position by engagement of the sub-mirror seat 17 with the second position defining pin 27.

The mirror-up shock-absorbing lever 43 is held in the second shock-absorbing standby position by the biasing force of the mirror-up shock-absorbing spring 44 and prevents the mirror-down shock-absorbing lever 41 from rotating in the biasing direction of the mirror-down shock-absorbing spring 42 (i.e., in the clockwise direction with respect to FIGS. 10 through 15) by making the rotationally restricted surface 43f of the side arm 43d contact the rotation-restricting surface 41c of the control arm 41b. At this stage, the mirror-down shock-absorbing lever 41 is in the overrun range thereof, in which the shock-absorbing pin 41a is disengaged from the shock-absorbing contact portion 16c of the mirror seat 16, so that the mirror-down shock-absorbing lever 41 does not play a role in the positioning of the main mirror seat 16, thus not interfering with the positioning of the main mirror seat 16, which is defined by the engagement of the mirror-down position defining pin 22 with the stopper 16a. More specifically, in the state shown in FIG. 10 that shows a side view of the main mirror seat 16, the stopper 16a and the shock-absorbing contact portion 16c, which are respectively formed on the laterally opposite sides of the main mirror seat 16, are shown as if they lie at the same position. In addition, the mirror-down shock-absorbing lever 41 which is prevented from rotating by the mirror-up shock-absorbing lever 43 locates the shock-absorbing pin 41a at a position advanced from the position of the mirror-down position defining pin 22 in a mirror-down direction (counterclockwise direction with respect to FIG. 10). With this relative positional relationship between the mirror-down position defining pin 22 and the shock-absorbing pin 41a, a state in which the mirror-down position defining pin 22 is in contact with the stopper 16a while the shock-absorbing pin 41a is in non-contact with the shock-absorbing contact portion 16c (a state in which the mirror-down shock-absorbing lever 41 is in the overrun range thereof) is obtained. Additionally, the press surface 41g, which is formed on the press piece 41f of the mirror-down shock-absorbing lever 41, is in contact with the front protruded portion 45c, which is formed on the arm 45a of the sub-mirror shock-absorbing lever 45, to thereby press the sub-mirror shock-absorbing lever 45 into the overrun range thereof, in which the shock-absorbing pin 45b is disengaged from the sub-mirror seat 17. Therefore, the sub-mirror shock-absorbing lever 45 does not play a role in the positioning of the sub-mirror seat 17, thus not interfering with the positioning of the sub-mirror seat 17, which is defined by the engagement of the mirror-down position defining pin 27 with the sub-mirror seat 17.

Figure 11:
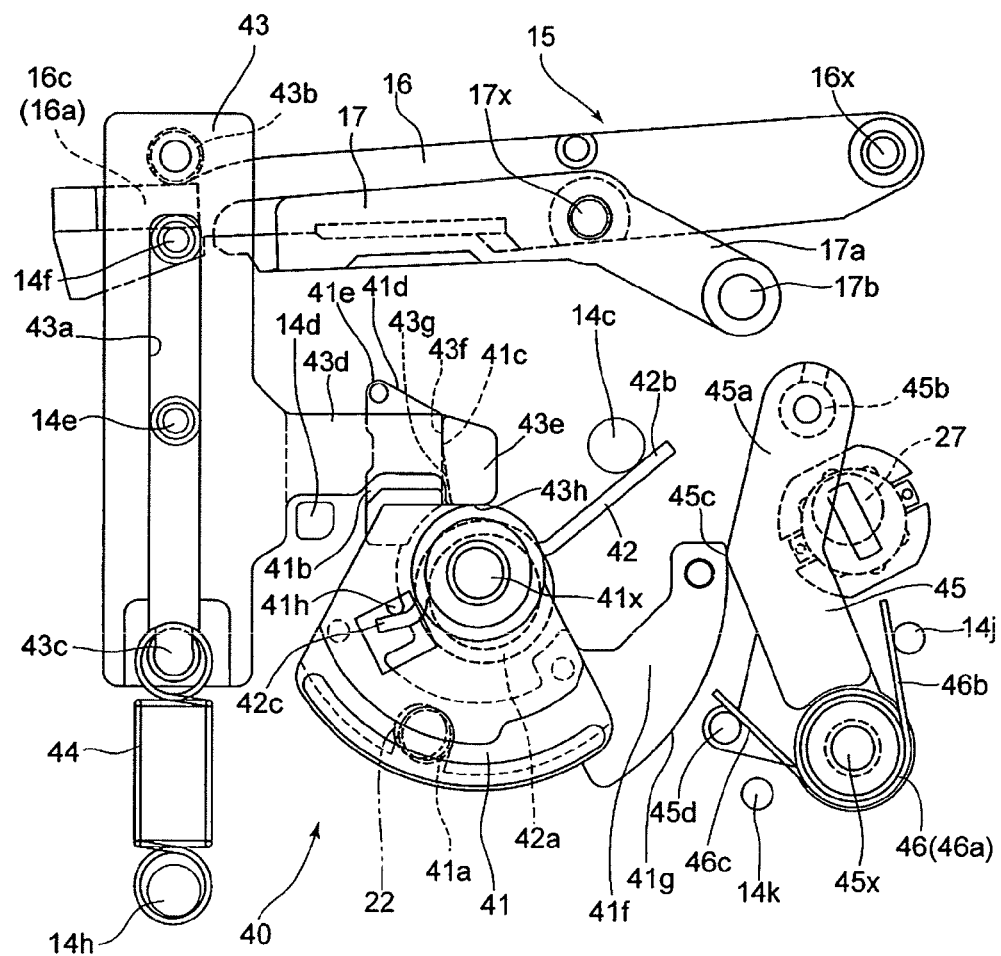
FIG. 11 is a side elevational view of the mirror bounce-suppressing mechanism in a state where the movable mirror is in the process of rotating to the mirror-up position from the mirror-down position.

When the main mirror seat 16 is rotated from the mirror-down position toward the mirror-up position by the mirror drive lever 34 of the mirror drive mechanism 30, this rotation of the main mirror seat 16 causes an upper surface of the shock-absorbing contact portion 16c of the main mirror seat 16 to come into contact with the shock-absorbing pin 43b of the mirror-up shock-absorbing lever 43 as shown in FIG. 11. At the instant shown in FIG. 11, the main mirror seat 16 has not yet reached the mirror-up position; during the rotation of the main mirror seat 16 to the mirror-up position shown in FIG. 12, the shock-absorbing contact portion 16c of the main mirror seat 16 lifts the shock-absorbing pin 43b to press and move the mirror-up shock-absorbing lever 43 upward from the second shock-absorbing standby position against the biasing force of the mirror-up shock-absorbing spring 44. Namely, in the mirror-up operation of the main mirror seat 16, the shock-absorbing effect of the mirror-up shock-absorbing lever 43 can be obtained in the range from the moment shown in FIG. 11 to the moment shown in FIG. 12.

When the mirror-up shock-absorbing lever 43 is pressed and moved (pushed) upward from the second shock-absorbing standby position, the rotation-restricting surface 43f of the side arm 43d retracts upward from the position where the rotation-restricting arm 43f faces the control arm 41b of the mirror-down shock-absorbing lever 41. Since the inclined cam surface 43g, which is formed to be continuous with the rotation-restricting surface 43f, is a surface which is inclined in a direction to increase the distance from the control arm 41b in the downward direction, the mirror-down shock-absorbing lever 41 which is released from the rotation restriction by the rotation-restricting surface 43f slightly rotates in the clockwise direction by the biasing force of the mirror-down shock-absorbing spring 42 while making the control arm 41b slide on the inclined cam surface 43g. Thereupon, the mirror bounce-suppressing mechanism 40 enters a state in which the inclined cam surface 41d of the mirror-down shock-absorbing lever 41 is in contact with the thick end-portion 43e of the mirror-up shock-absorbing lever 43 (portion of the mirror-up shock-absorbing lever 43 at the boundary between the inclined cam surface 43g and the downward movement restricting surface 43h). At this stage, the main mirror seat 16 has not yet reached the mirror-up position.

Upon the mirror bounce-suppressing mechanism 40 reaching this state, the upward pressing force of the control arm 41b of the mirror-down shock-absorbing lever 41 that rotates to the first shock-absorbing standby position by the biasing force of the mirror-down shock-absorbing spring 42 also acts on the mirror-up shock-absorbing lever 43 together with the upward pressing force of the shock-absorbing contact portion 16c of the main mirror seat 16. Specifically, upon the mirror-down shock-absorbing lever 41 rotating in the clockwise direction with respect to FIG. 11 by the biasing force of the mirror-down shock-absorbing spring 42, a component of force occurs which acts on the mirror-up shock-absorbing lever 43 to push the mirror-up shock-absorbing lever 43 upward in accordance with the inclination shape of the inclined cam surface 41d while making the inclined cam surface 41d slide against the thick end-portion 43e. Until the time when the mirror bounce-suppressing mechanism 40 enters this state from the commencement of contact between the shock-absorbing contact portion 16c and the shock-absorbing pin 43b shown in FIG. 11, the movement resistance of the mirror-up shock-absorbing spring 44 against the mirror-up shock-absorbing lever 43 gradually increases. However, since the mirror-down shock-absorbing lever 41 supplementarily presses the mirror-up shock-absorbing lever 43 upward, the load of the mirror-up shock-absorbing lever 43 against the main mirror seat 16 does not become excessive, so that the mirror-up shock-absorbing lever 43 can be reliably and securely moved to the upper position, which corresponds to the mirror-up position of the main mirror seat 16. In other words, the mirror-up shock-absorbing lever 43 does not prevent the main mirror seat 16 from reaching the mirror-up position. Note that while the mirror-down shock-absorbing lever 41 presses against the mirror-up shock-absorbing lever 43 via the inclined cam surface 41d, a pressing component force also acts on the mirror-up shock-absorbing lever 43 in a direction intersecting the linear movement direction of the guiding action of the guide hole 43a and the guide pins 14e and 14f, so that any backlash that would otherwise occur between the guide hole 43a and the guide pins 14e and 14f is absorbed, and accordingly, an effect is also obtained in which the mirror-up shock-absorbing lever 43 can smoothly move without play.

Figure 12:
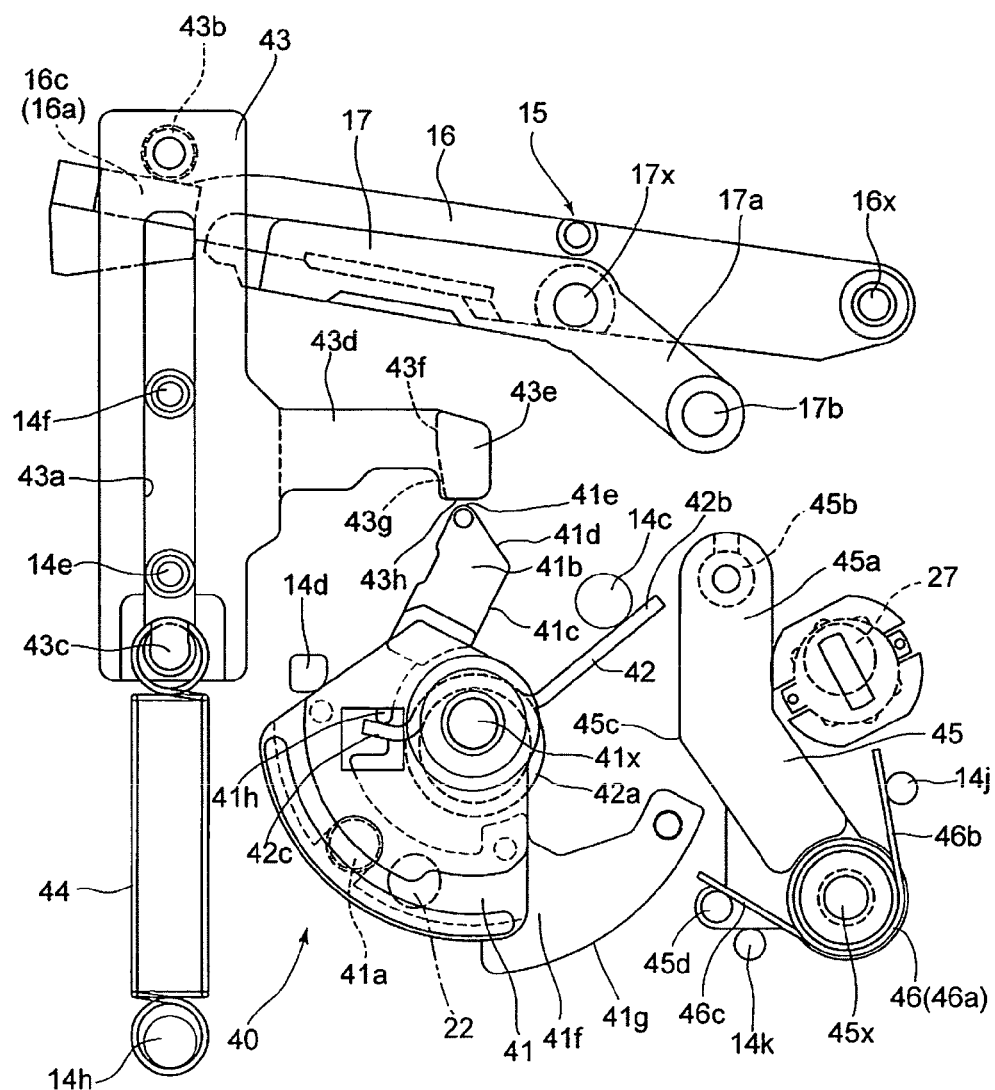
FIG. 12 is a side elevational view of the mirror bounce-suppressing mechanism in the mirror-up state.

Thereafter, upon the mirror-up shock-absorbing lever 43 being moved upward until the entire side arm 43d is totally removed upwardly from the rotational path of the control arm 41b, the rotational restriction against the mirror-down shock-absorbing lever 41 is completely released, so that the mirror-down shock-absorbing lever 41 rotates until the first shock-absorbing standby position, at which the mirror-down shock-absorbing lever 41 abuts against the rotational limit projection 14d, by the biasing force of the mirror-down shock-absorbing spring 42 (see FIG. 12). When the mirror-down shock-absorbing lever 41 is in the first shock-absorbing standby position, the downward-restricting protrusion 41a is positioned obliquely above the mirror-down position defining pin 22, i.e., at a position advanced in the mirror-up position of the main mirror seat 16 (the clockwise direction with respect to FIG. 12) (a position where the shock-absorbing contact portion 16c of the main mirror seat 16 and the downward-restricting protrusion 41a come into contact with each other before the stopper 16a of the main mirror seat 16 and the mirror-down position defining pin 22 come into contact with each other when the main mirror seat 16 rotates to the mirror-down position).

When the movable mirror 15 is in the mirror-up position as shown in FIG. 12, the engagement of an upper surface of the main mirror seat 16 with the upper stopper 21 prevents the movable mirror 15 from moving further upward (see FIG. 1). Although the mirror-up shock-absorbing lever 43 can move up to a position (upper movement limit thereof) where the lower end of the guide hole 43a comes into contact with the guide pin 14e, the main mirror seat 16 comes into contact with the upper stopper 21 before the mirror-up shock-absorbing lever 43 reaches the upper movement limit. Namely, similar to the mirror-down shock-absorbing lever 41 and the sub-mirror shock-absorbing lever 45, the mirror-up shock-absorbing lever 43 also has an overrun range which exceeds the aforementioned shock-absorbing moving range in which the shock-absorbing pin 43b is pressed by the shock-absorbing contact portion 16c of the main mirror seat 16. In this overrun range, the shock-absorbing pin 43b can be made to be disengaged from the hock-absorbing contact portion 16c of the main mirror seat 16 suspended in the mirror-up position by the upper stopper 21.

As shown in FIG. 12, when the mirror-down shock-absorbing lever 41 is rotated to the first shock-absorbing standby position, the downward movement restricting convex portion 41e of the control arm 41b is positioned immediately below the downward movement restricting surface 43h of the mirror-up shock-absorbing lever 43. FIG. 12 shows a state where the mirror-up shock-absorbing lever 43 has been moved up by the main mirror seat 16 rotated to the mirror-up position to thereby create a slight gap between the downward movement restricting convex portion 41e and the downward movement restricting surface 43h. From this state, if the mirror-up shock-absorbing lever 43 attempts to move downward, the downward movement restricting surface 43h comes into contact with the downward movement restricting convex portion 41e (see FIG. 14), which prevents the mirror-up shock-absorbing lever 43 from moving downward.

As described above, when the main mirror seat 16 rotates from the mirror-down position to the mirror-up position, the spring load of the mirror-up shock-absorbing spring 44 is exerted on rotation of the main mirror seat 16 to absorb shock of the main mirror seat 16 by engagement of the shock-absorbing contact portion 16c of the main mirror sheet 16 with the shock-absorbing pin 43b of the mirror-up shock-absorbing lever 43. Additionally, the range of movement (the amount of downward movement) of the mirror-up shock-absorbing lever 43 in a state where the main mirror seat 16 has reached the mirror-up position is limited to an extremely small range by the engagement between the control arm 41b (the downward movement restricting convex portion 41e) of the mirror-down shock-absorbing lever 41 and the thick end-portion 43e (the downward movement restricting surface 43h) of the side arm 43d of the mirror-up shock-absorbing lever 43. This reduces the degree of rebounding movement of the mirror-up shock-absorbing lever 43, shortens the duration of bouncing (vibration) of the main mirror seat 16 and reduces the number of bounces thereof when the main mirror seat 16 rotates to the mirror-up position. Namely, the shock-absorbing capability for the main mirror seat 16 is enhanced. Additionally, by supplementarily pressing, immediately before the main mirror seat 16 reaches the mirror-up position, the mirror-up shock-absorbing lever 43 upward, toward the first shock-absorbing standby position, via the inclined cam surface 41*d* of the mirror-down shock-absorbing lever 41 which rotates toward the first shock-absorbing stand-by position, the mirror-up shock-absorbing lever 43 can be reliably and securely moved to the upper position, which corresponds to the mirror-up position of the main mirror seat 16.

When the main mirror seat 16 rotates from the mirror-down position to the mirror-up position, the sub-mirror seat 17 is linked with the main mirror seat 16 via the linkage lever 23 to be rotated from the jutting-out position to the retracted position. As described above, the mirror-down shock-absorbing lever 41 is rotated until the first shock-absorbing standby position being released from the rotational restriction thereon that is imposed by the mirror-up shock-absorbing lever 43. This rotation of the mirror-down shock-absorbing lever 41 causes the press surface 41*g* of the press piece 41*f* to move away from the arm 45*a* to thereby release the pressure against the sub-mirror shock-absorbing lever 45. As a result, the sub-mirror shock-absorbing lever 45 is rotated by the biasing force of the sub-mirror shock-absorbing spring 46 until the third shock-absorbing standby position (see FIG. 12). As shown in FIG. 12, when the sub-mirror shock-absorbing lever 45 is in the third shock-absorbing standby position, the shock-absorbing pin 45*b* is positioned obliquely above the second position defining pin 27, i.e., at a position advanced in the mirror-up position of the movable mirror 15 (the clockwise direction with respect to FIG. 12) (a position where the sub-mirror seat 17 and the shock-absorbing pin 45*b* come into contact with each other before the sub-mirror seat 17 and the second position defining pin 27 come into contact with each other when the main mirror seat 16 rotates to the mirror-down position).

Figure 13:
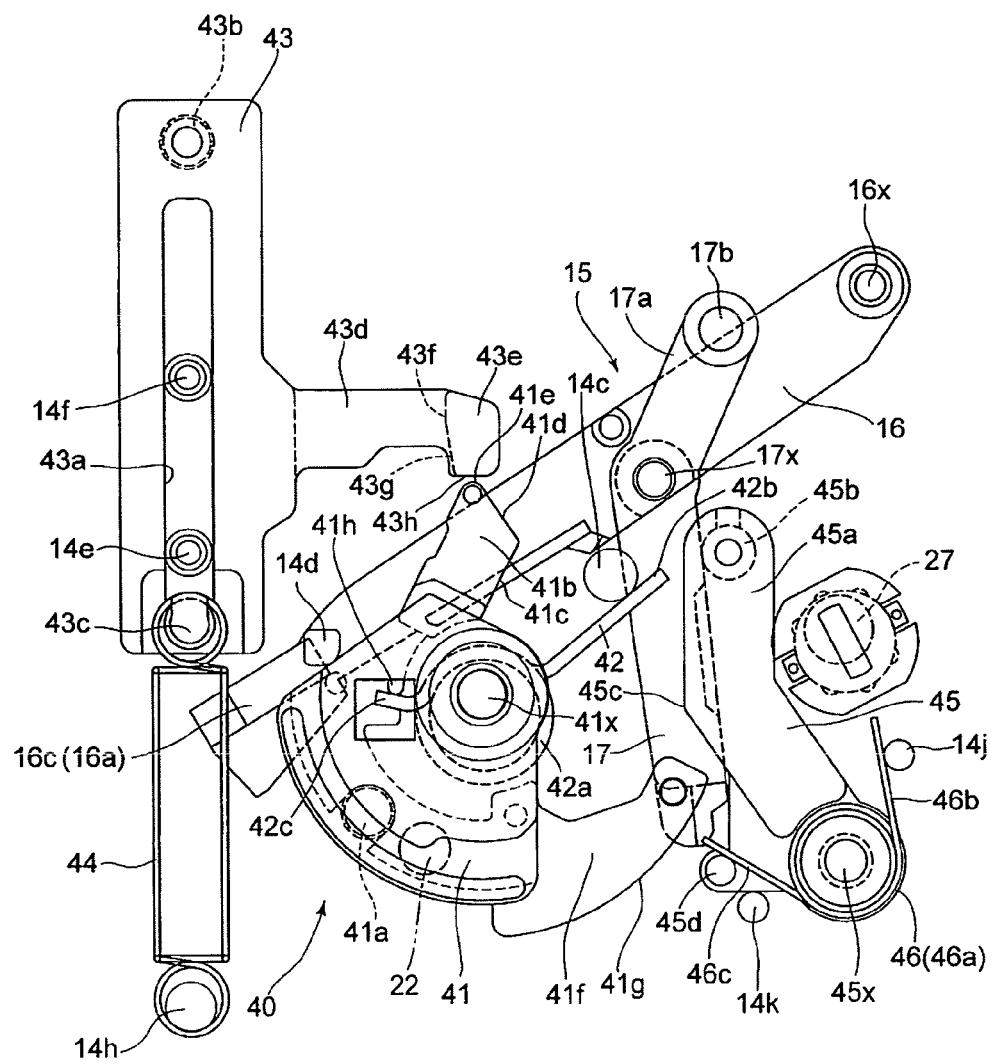
FIG. 13 is a side elevational view of the mirror bounce-suppressing mechanism in a state where the movable mirror is in the process of rotating to the mirror-down position from the mirror-up position.

Contrary to the above described operations to move the movable mirror 15 to the mirror-up position, when the main mirror seat 16 rotates from the mirror-up position that is shown in FIG. 12 toward the mirror-down position by the mirror drive lever 34 of the mirror drive mechanism 30, the sub-mirror seat 17 rotates counterclockwise with respect to FIG. 12 (i.e., toward the jutting-out position) about the pair of sub-mirror support shafts 17*x* via the linkage lever 23 while rotating about the pair of main-mirror support shafts 16*x* to move obliquely downward with the main mirror seat 16. Thereupon, as shown in FIG. 13, the sub-mirror seat 17 comes into contact with the shock-absorbing pin 45*b* of the sub-mirror shock-absorbing lever 45 before coming into contact with the second position defining pin 27. At this stage, the sub-mirror shock-absorbing lever 45 is held in the third shock-absorbing standby position by the biasing force of the sub-mirror shock-absorbing spring 46, and further rotation of the sub-mirror seat 17 toward the jutting-out position causes the sub-mirror seat 17 to press and rotate the sub-mirror shock-absorbing lever 45 clockwise from the third shock-absorbing standby position. During this rotation of the sub-mirror shock-absorbing lever 45 in the shock-absorbing moving range that starts from the third shock-absorbing standby position, the spring load of the sub-mirror shock-absorbing spring 46 is exerted on the rotation of the sub-mirror seat 17, so that the sub-mirror seat 17 moves to the jutting-out position while being shock-absorbed (cushioned) by the sub-mirror shock-absorbing lever 45 and the sub-mirror shock-absorbing spring 46. Consequently, the occurrence of bouncing (vibrations) of the sub-mirror seat 17 when the movable mirror 15 rotates from the mirror-up position to the mirror-down position is suppressed (the duration of the bouncing becomes reduced and the number of bounces of the sub-mirror seat 17 becomes small).

Figure 14:
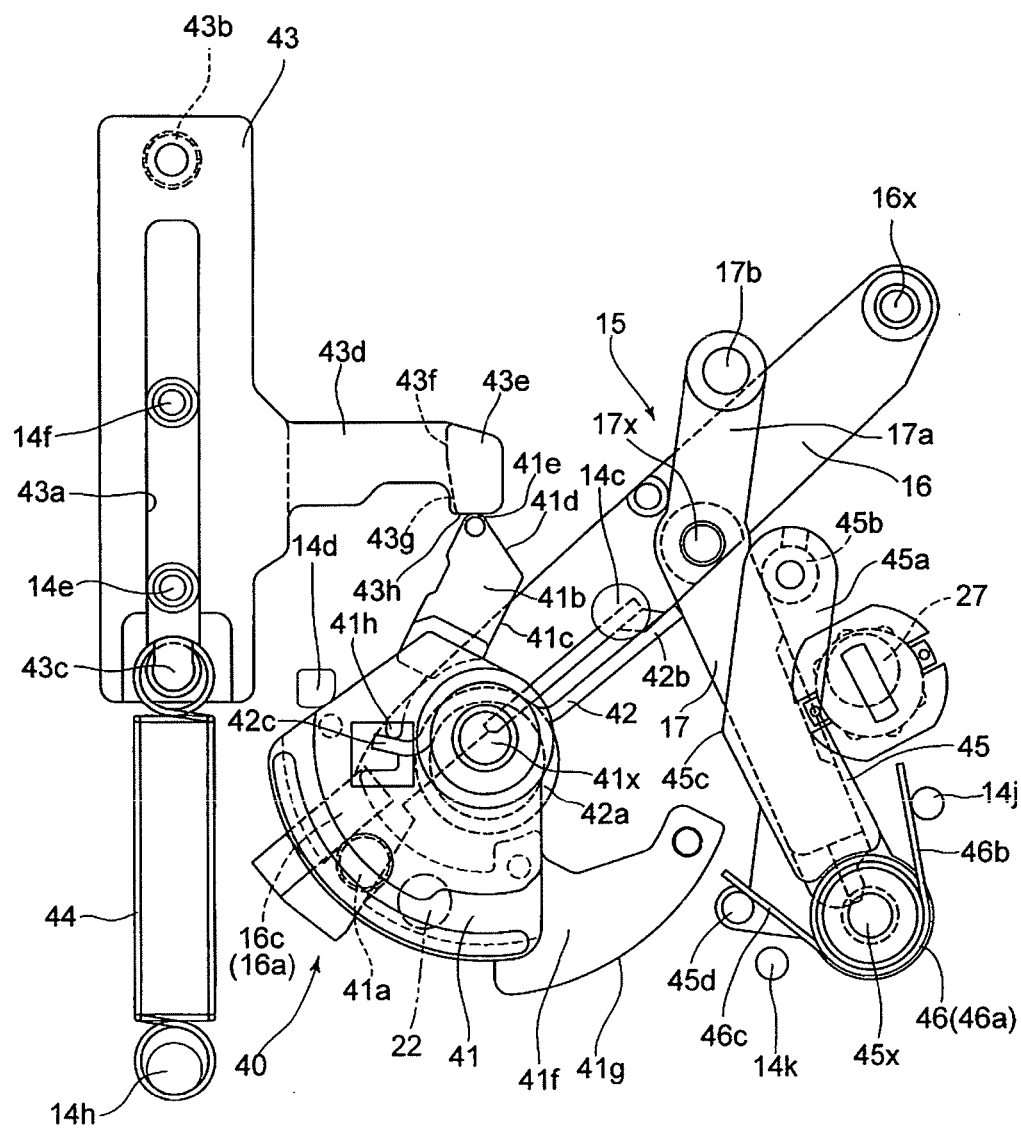
FIG. 14 is a side elevational view of the mirror bounce-suppressing mechanism in a state where the movable mirror has further rotated toward the mirror-down position from the position shown in FIG. 13.

Further rotation of the main mirror seat 16 toward the mirror-down position from the position shown in FIG. 13 causes the shock-absorbing contact portion 16*c* of the main mirror seat 16 to come into contact with the shock-absorbing pin 41*a* of the mirror-down shock-absorbing lever 41 before the stopper 16*a* of the main mirror seat 16 comes into contact with the mirror-down position defining pin 22 as shown in FIG. 14. At this stage, the mirror-down shock-absorbing lever 41 is held in the first shock-absorbing standby position by the biasing force of the mirror-down shock-absorbing spring 42, and downward movement of the mirror-up shock-absorbing lever 43 is restricted by the downward movement restricting convex portion 41*e* and the downward movement restricting surface 43*h* abutting against each other.

Further rotation of the main mirror seat 16 toward the mirror-down position from the position shown in FIG. 14 causes the shock-absorbing contact portion 16*c* of the main mirror seat 16 to depress the shock-absorbing pin 41*a* of the mirror-down shock-absorbing lever 41 to rotate the mirror-down shock-absorbing lever 41 counterclockwise with respect to FIG. 14 from the first shock-absorbing standby position against the biasing force of the mirror-down shock-absorbing spring 42. During this rotation of the mirror-down shock-absorbing lever 41 in the shock-absorbing moving range that starts from the first shock-absorbing standby position, the spring load of the sub-mirror shock-absorbing spring 42 is exerted on the rotation of the main mirror seat 16, so that the main mirror seat 16 moves toward the mirror-down position while being shock-absorbed (cushioned) by the mirror-down shock-absorbing lever 41 and the sub-mirror shock-absorbing spring 42. Consequently, the occurrence of bouncing (vibrations) of the main mirror seat 16 when the main mirror seat 16 rotates from the mirror-up position to the mirror-down position is suppressed (the duration of the bouncing becomes reduced and the number of bounces of the main mirror seat 16 becomes small).

Figure 15:
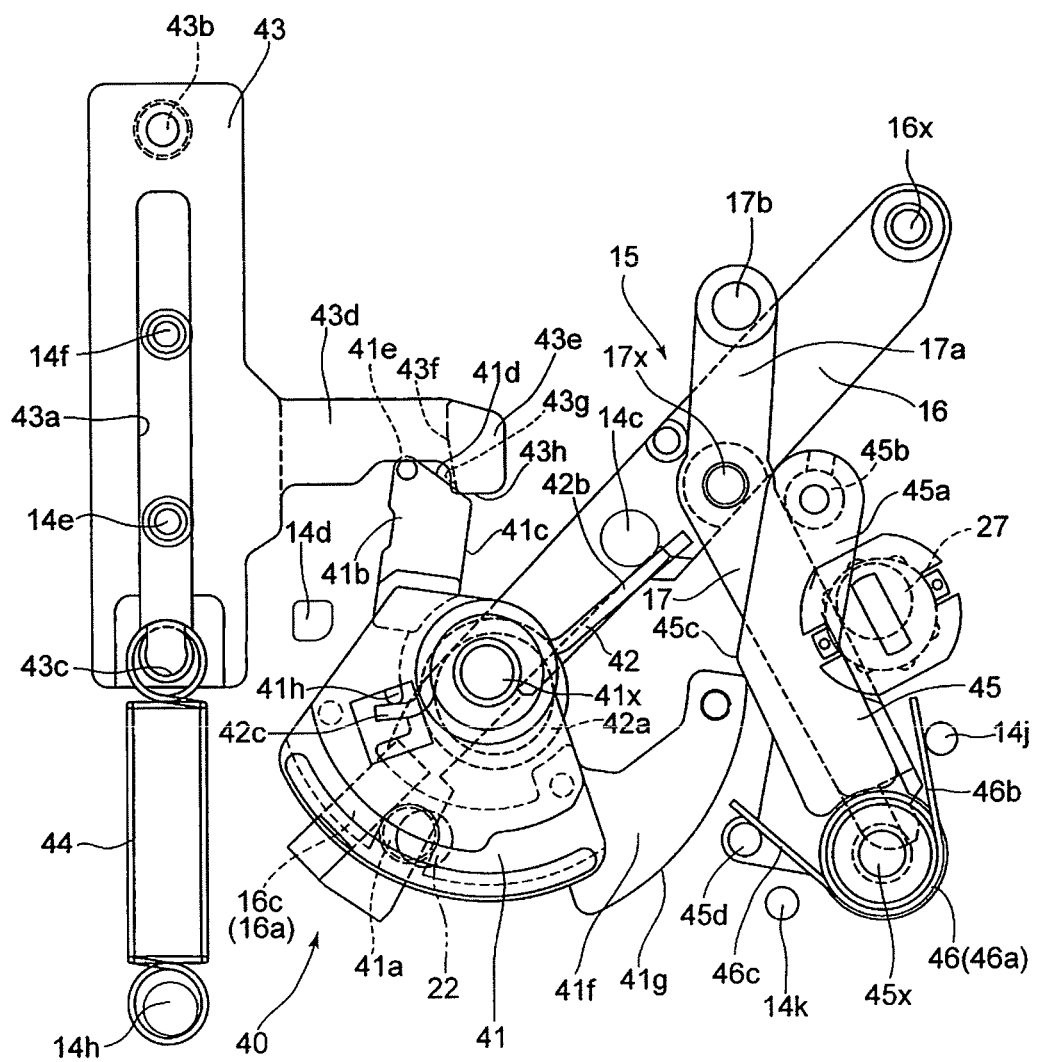
FIG. 15 is a side elevational view of the mirror bounce-suppressing mechanism in a state where the movable mirror has further rotated toward the mirror-down position from the position shown in FIG. 14.

When the mirror-down shock-absorbing lever 41 is pressed by the main mirror seat 16 to rotate counterclockwise from the position shown in FIG. 14, the press piece 41*f* of the mirror-down shock-absorbing lever 41 comes into contact with the arm 45*a* of the sub-mirror shock-absorbing lever 45 as shown in FIG. 15.

Upon slightly rotating counterclockwise from the position shown in FIG. 15, the main mirror seat 16 reaches the mirror-down position, in which the main mirror seat 16 makes the stopper 16*a* contact the mirror-down position defining pin 22. The range until this position from the position shown in FIG. 14 corresponds to the range (shock-absorbing moving range) in which the shock-absorbing effect of the mirror-down shock-absorbing lever 41 is obtained, and the mirror-down shock-absorbing lever 41 is further rotated counterclockwise by the inertial force from the position in which the main mirror seat 16 contacts the mirror-down position defining pin 22 until the above-mentioned overrun range that is advanced further in the counterclockwise direction. When the main mirror seat 16 reaches the mirror-down position, the downward-restricting protrusion 41*e* of the mirror-down shock-absorbing lever 41 is already removed from the lower position of the downward-movement restricting surface 43*h* of the sidearm 43*d*, so that the mirror-up shock-absorbing lever 43 which has been released from restriction of downward movement thereof is moved toward the second shock-absorbing standby position by the biasing force of the mirror-up shock-absorbing spring 44, and the inclined cam surface 43*g* abuts against the control arm 41b (portion of the control arm 41b at the boundary between the rotationally restricted surface 41c and the inclined cam surface 41d). Thereafter, the downward pressing force of the side arm 43d (the thick end-portion 43e) of the mirror-up shock-absorbing lever 43, which moves toward the second shock-absorbing standby position by the biasing force of the mirror-up shock-absorbing spring 44, together with the inertial moving force of the mirror-up shock-absorbing lever 43 also acts on the mirror-down shock-absorbing lever 41. Specifically, when the mirror-up shock-absorbing lever 43 moves down by the biasing force of the mirror-up shock-absorbing spring 44, a component force occurs which rotates the mirror-down shock-absorbing lever 41 in the counterclockwise direction in accordance with the inclined shape of the inclined cam surface 43g while the inclined cam surface 43g slides against the control arm 41b. The movement resistance of the downward-absorbing spring 42 against the mirror-down shock-absorbing lever 41 gradually increases from when the shock-absorbing contact portion 16c and the shock-absorbing pin 41a start to abut each other, as shown in FIG. 14, until when the main mirror seat 16 reaches the mirror-down position. However, since the mirror-up shock-absorbing lever 43 supplementarily presses the mirror-down shock-absorbing lever 41, the mirror-down shock-absorbing lever 41 can reliably and securely be moved to the lower position which corresponds to the mirror-down position of the main mirror seat 16. In other words, the mirror-down shock-absorbing lever 41 does not prevent the main mirror seat 16 from reaching the mirror-down position.

When the mirror-down shock-absorbing lever 41 rotates to the overrun range thereof, the entire control arm 41b is totally removed from the vertical movement path of the thick end-portion 43e of the mirror-up shock-absorbing lever 43 as shown in FIG. 10, so that the mirror-up shock-absorbing lever 43 which has been released from restriction of downward movement thereof is moved to the second shock-absorbing standby position, at which the upper end of the guide hole 43a is engaged with the guide pin 14f, by the biasing force of the mirror-up shock-absorbing spring 44. Additionally, the mirror-down shock-absorbing lever 41 makes the rotation-restricting surface 41c of the control arm 41b contact the rotationally restricted surface 43f of the side arm 43d of the mirror-up shock-absorbing lever 43 to be held in the overrun range, in which the shock-absorbing pin 41a is disengaged from the shock-absorbing contact portion 16c of the mirror seat 16. Namely, the mirror-down shock-absorbing lever 41 functions as a shock-absorbing member in the shock-absorbing moving range thereof, in which the shock-absorbing pin 41a is engaged with the shock-absorbing contact portion 16c of the mirror seat 16, when the main mirror seat 16 rotates toward the mirror-down position; whereas, in a state where the main mirror seat 16 has reached the mirror-down position, the mirror-down shock-absorbing lever 41 is held in a non-contact position with respect to the main mirror seat 16 (in the overrun range of the mirror-down shock-absorbing lever 41) by the mirror-up shock-absorbing lever 43, thus not interfering with the positioning of the main mirror seat 16 that is defined by the mirror-down position defining pin 22.

Counterclockwise rotation of the mirror-down shock-absorbing lever 41 from the state shown in FIG. 15 toward the overrun range thereof causes the press piece 41f to press the arm 45a to rotate the sub-mirror shock-absorbing lever 45 up to the overrun range thereof as shown in FIG. 10. At this stage, the circular-arc-shaped press surface 41g of the press piece 41f presses the sub-mirror shock-absorbing lever 45 while sliding on the front protruded portion 45c, which achieves smooth operation without getting snagged. When the main mirror seat 16 reaches the mirror-down position as shown in FIG. 10 and the sub-mirror seat 17 reaches the jutting-out position, in which the sub-mirror seat 17 comes in contact with the second position defining pin 27, which move in response to the rotation of the main mirror seat 16 to the mirror-down position, the sub-mirror shock-absorbing lever 45 pressed by the mirror-down shock-absorbing lever 41 is rotated up to the overrun range thereof to disengage the shock-absorbing pin 45b from the sub-mirror seat 17. Namely, the sub-mirror shock-absorbing lever 45 functions as a shock-absorbing member in the shock-absorbing moving range thereof, in which the shock-absorbing pin 45b is engaged with the sub-mirror seat 17, when the sub-mirror seat 17 rotates toward the jutting-out position; whereas, in a state where the sub-mirror seat 17 has reached the jutting-out position, the sub-mirror shock-absorbing lever 45 is held in a non-contact position with respect to the sub-mirror seat 17 (in the overrun range of the sub-mirror shock-absorbing lever 45) by the mirror-down shock-absorbing lever 41, thus not interfering with the positioning of the sub-mirror seat 17 that is defined by the second position defining pin 27.

As described above, in the present embodiment of the camera 10, the mirror-down shock-absorbing lever 41 and the mirror-up shock-absorbing lever 43, which constitute components of the mirror bounce-suppressing mechanism 40, are brought into contact with the main mirror seat 16 to suppress bouncing of the main mirror seat 16 when the main mirror seat 16 rotates between the mirror-down position and the mirror-up position. In addition, the sub-mirror shock-absorbing lever 45, which constitutes a component of the mirror bounce-suppressing mechanism 40, is brought into contact with the sub-mirror seat 17 to suppress bouncing of the sub-mirror seat 17 when the main mirror seat 16 rotates to the mirror-down position. These operations make it possible to prevent camera shake (image shake) due to shock of the movable mirror 15 and delays in arithmetic processing using the photometering unit 25 and the distance measuring unit 26 and to achieve an improvement in observational performance of the viewfinder and continuous photographing capability of the camera 10.

As for the bounce suppression for the main mirror seat 16, the mirror-down shock-absorbing lever 41 also serves as a device which limits the range of movement of the mirror-up shock-absorbing lever 43 when the movable mirror 15 is in the mirror-up state, while the mirror-up shock-absorbing lever 43 also serves as a device which limits the range of movement of the mirror-down shock-absorbing lever 41 when the movable mirror 15 is in the mirror-down state. Accordingly, it is not necessary to provide any additional member which limits the range of movement of the mirror-down shock-absorbing lever 41 or the mirror-up shock-absorbing lever 43, so that the mirror shock-absorbing mechanism 40 is simple in structure, having a small number of components, and can obtain an excellent shock-absorbing performance. Specifically, the mirror-up shock-absorbing lever 43, which absorbs shock of the main mirror seat 16 when the movable mirror 15 rotates to the mirror-up position, also serves as a device which holds the mirror-down shock-absorbing lever 41 (the shock-absorbing pin 41a) in a non-contact position with respect to the main mirror seat 16 (in the overrun range of the mirror-down shock-absorbing lever 41, in which the mirror-down shock-absorbing lever 41 does not contact the main mirror seat 16) and which ensures a high-precision positioning of the main mirror seat 16 by the mirror-down position defining pin 22 when the main mirror seat 16 is in the mirror-down position. Accordingly, the mirror-down shock-absorbing lever 41 is made to function securely as a shock-absorbing member for the main mirror seat 16 when the movable mirror 15 rotates to the mirror-down position, whereas the mirror-down shock-absorbing lever 41 can be held in a non-contact position with respect to the main mirror seat 16 upon the main mirror seat 16 reaching the mirror-down position with no need to provide any special holding member other than the mirror-up shock-absorbing lever 43. Additionally, the biasing forces of the mirror-down shock-absorbing spring 42 and the mirror-up shock-absorbing spring 44 are used not only for absorbing shock of the main mirror seat 16 but also for engaging the mirror-down shock-absorbing lever 41 and the mirror-up shock-absorbing lever 43 with each other.

In addition, the mirror-up shock-absorbing lever 43 that absorbs shock of the main mirror seat 16 is supplementarily pressed and moved (pushed) to the position (shown in FIG. 12) corresponding to the mirror-up state by the mirror-down shock-absorbing lever 41 when the main mirror seat 16 rotates to the mirror-up position, and the mirror-down shock-absorbing lever 41 that absorbs shock of the main mirror seat 16 is supplementarily pressed and moved (pushed) to the position (shown in FIG. 10) corresponding to the mirror-down state by the mirror-up shock-absorbing lever 43. With these operations, the mirror-down shock-absorbing lever 41 and the mirror-up shock-absorbing lever 43 can be securely moved to their respective positions after shock absorption without solely depending on the rotational movement of the main mirror seat 16. According to this structure, the main mirror seat 16 is not prevented from rotating to the mirror-down position or the mirror-up position even in the case where the biasing forces of the mirror-down shock-absorbing spring 42 and the mirror-up shock-absorbing spring 44 are set to be strong, which improves the degree of freedom in setting the shock-absorbing performance using the mirror-down shock-absorbing lever 41 and the mirror-up shock-absorbing lever 43. Additionally, since the aforementioned supplemental press-movements of the mirror-down shock-absorbing lever 41 and the mirror-up shock-absorbing lever 43 are mutually performed by the mirror-down shock-absorbing lever 41 and the mirror-up shock-absorbing lever 43, it is not necessary to provide any additional mechanism for pressing and moving the mirror-down shock-absorbing lever 41 and the mirror-up shock-absorbing lever 43, which does not increase the number of components.

As for the bounce suppression for the sub-mirror seat 17, the mirror-down shock-absorbing lever 41, which absorbs shock of the main mirror seat 16 when the movable mirror 15 rotates to the mirror-down position, also serves as a device which holds the sub-mirror shock-absorbing lever 45 (the shock-absorbing pin 45*b*) in a non-contact position with respect to the sub-mirror seat 17 (in the overrun range of the sub-mirror shock-absorbing lever 45, in which the sub-mirror shock-absorbing lever 45 does not contact the sub-mirror seat 17) and which ensures a high-precision positioning of the sub-mirror seat 17 by the second position defining pin 27 when the sub-mirror seat 17 is in the jutting-out position. Accordingly, the sub-mirror shock-absorbing lever 45 is made to function securely as a shock-absorbing member for the sub-mirror seat 17 when the movable mirror 15 rotates to the mirror-down position, whereas the sub-mirror shock-absorbing lever 45 can be held in a non-contact state with respect to the sub-mirror seat 17 upon the sub-mirror seat 17 reaching the jutting-out position with no need to provide any special holding member other than the mirror-down shock-absorbing lever 41.

Since the holding of the mirror-down shock-absorbing lever 41 when the movable mirror 15 is in the mirror-down state is carried out by the mirror-up shock-absorbing lever 43 as described above, each of the mirror-down shock-absorbing lever 41 and the sub-mirror shock-absorbing lever 45 can be held in a non-contact position with respect to the movable mirror 15 with no need to use an independent holding member, so that bounce suppression and precise positioning for the main mirror seat 16 and the sub-mirror seat 17 can be achieved with a small number of components. In addition, since the mirror-down shock-absorbing lever 41, the mirror-up shock-absorbing lever and the sub-mirror shock-absorbing lever 45 are independently spring-biased, the load setting is easy.

In the above described embodiment, when the movable mirror 15 is in the mirror-down state, the mirror-down shock-absorbing lever 41 is held in the overrun range thereof, in which the mirror-down shock-absorbing lever 41 is disengaged from the main mirror seat 16 (the shock-absorbing contact portion 16*c*), by the mirror-up shock-absorbing lever 43, and the sub-mirror shock-absorbing lever 45 is held in the overrun range thereof, in which the sub-mirror shock-absorbing lever 45 is disengaged from the sub-mirror seat 17, by the mirror-down shock-absorbing lever 41. Contrary to this, when the movable mirror 15 is in the mirror-up position, the mirror bounce-suppressing mechanism 40 can be modified such that the shock-absorbing members for the main mirror seat 16 and the sub-mirror seat 17 are held in their respective overrun ranges.

More specifically, upon the movable mirror 15 rotating to the mirror-up position as shown in FIG. 12, the mirror-up shock-absorbing lever 43 is lifted into the overrun range thereof, in which the shock-absorbing pin 43*b* is disengaged from the shock-absorbing contact portion 16*c* of the main mirror seat 16, by the control arm 41*b* (the downward movement restricting convex portion 41*e*) of the mirror-down shock-absorbing lever 41. In addition, the mirror bounce-suppressing mechanism 40 is provided, independently of the sub-mirror shock-absorbing lever 45, with a sub-mirror shock-absorbing member for use on mirror-up which absorbs shock of the sub-mirror seat 17 rotating from the jutting-out position to the retracted position, by coming into contact with the sub-mirror seat 17 when the movable mirror 15 rotates from the mirror-down position to the mirror-up position. Similar to the sub-mirror shock-absorbing lever 45, this sub-mirror shock-absorbing member for use on mirror-up can operate between a shock-absorbing moving range having a shock-absorbing stand-by position at one end thereof and an overrun range which exceeds this shock-absorbing moving range and is biased toward the shock-absorbing stand-by position. In a state where the sub-mirror seat 17 has reached the retracted position shown in FIG. 12 on completion of the mirror-up operation of the movable mirror 15, the sub-mirror shock-absorbing member for use on mirror-up is pressed and moved up to the overrun range thereof by the mirror-up shock-absorbing lever 43. At this stage, since the mirror-up shock-absorbing lever 43 itself is held in the overrun range thereof, the mirror-up shock-absorbing lever 43 and the sub-mirror shock-absorbing member for use on mirror-up are held in a state of being disengaged from the main mirror seat 16 and the sub-mirror seat 17, respectively. In other words, in this modified embodiment, the mirror-up shock-absorbing lever 43, the mirror-down shock-absorbing lever 41 and the sub-mirror shock-absorbing member for use on mirror-up serve as the first shock-absorbing member, the second shock-absorbing member and the third shock-absorbing member, respectively; and the shock-absorbing spring 44, the mirror-down shock-absorbing spring 42 and a biaser which biases the sub-mirror shock-absorbing member for use on mirror-up serve as the first biaser, the second biaser and the third biaser, respectively, and effects similar to those obtained in the above illustrated embodiment can also be obtained.

Although the present invention has been described with reference to the above illustrated embodiment, the present invention is not limited to this particular embodiment. For instance, although the mirror-down shock-absorbing lever 41 and the sub-mirror shock-absorbing lever 45 are rotational members which rotate about the shafts 41x and 45x, respectively, in the mirror bounce-suppressing mechanism 40, and the mirror-up shock-absorbing lever 43 is a linear moving member, the moving manner (moving directions) of these shock-absorbing members (41, 43 and 45) that operate when the movable mirror 15 rotates up and down can be different in combination.

Additionally, the mirror-down shock-absorbing spring 42 and the sub-mirror shock-absorbing spring 46, which bias the mirror-down shock-absorbing lever 41 and the sub-mirror shock-absorbing lever 45, are torsion springs, respectively, while the mirror-up shock-absorbing spring 44, which biases the mirror-up shock-absorbing lever 43, is an extension spring in the above illustrated embodiment. However, the biasers for these levers 41, 43 and 45 are not limited to these particular types of springs. For instance, it is possible for the mirror-up shock-absorbing lever 43 to be biased by a torsion spring and that the mirror-down shock-absorbing lever 41 and for the sub-mirror shock-absorbing lever 45 to be biased by their respective extension springs.

Additionally, in the above illustrated embodiment, the shock-absorbing members for the movable mirror 15 can be different in detailed shape from the mirror-down shock-absorbing lever 41, the mirror-up shock-absorbing lever 43 and the sub-mirror shock-absorbing lever 45 of the above illustrated embodiment.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A movable-mirror drive mechanism of a camera, comprising:
    a main-mirror support member which supports a main mirror and is supported to be rotatable about a first axis between a viewfinder light-guiding position, in which said main mirror is positioned in a photographing optical path to reflect incident light emanated from an object toward a viewfinder optical system of said camera, and a retracted position, in which said main mirror is retracted from said photographing optical path to allow said object-emanated light to travel toward a photographic light-receiving medium;
    a sub-mirror support member which supports a sub-mirror and is supported to be rotatable relative to said main-mirror support member about a second axis which is substantially parallel to said first axis and is positioned in a jutting-out position, in which said sub-mirror juts from said main mirror in said photographing optical path, when said main-mirror support member is in said viewfinder light-guiding position, and which is positioned in a sub-mirror retracted position, in which said sub-mirror is retracted to a back of said main mirror, when said main-mirror support member is in said retracted position;
    a first shock-absorbing member which is held in a first shock-absorbing stand-by position by a first biaser, said first shock-absorbing member coming into contact with said main-mirror support member and being pressed and moved thereby against a biasing force of said first biaser to absorb shock of said main-mirror support member when said main-mirror support member rotates from said retracted position to said viewfinder light-guiding position;
    a second shock-absorbing member which is held in a second shock-absorbing stand-by position by a second biaser, said second shock-absorbing member coming into contact with said main-mirror support member and being pressed and moved thereby against a biasing force of said second biaser to absorb shock of said main-mirror support member when said main-mirror support member rotates from said viewfinder light-guiding position to said retracted position; and
    a third shock-absorbing member which is held in a third shock-absorbing stand-by position by a third biaser, said third shock-absorbing member coming into contact with said sub-mirror support member and being pressed and moved thereby against a biasing force of said third biaser to absorb shock of said sub-mirror support member when said sub-mirror support member rotates from said sub-mirror retracted position to said jutting-out position in association with rotation of said main-mirror support member to said viewfinder light-guiding position,
    wherein, when said main-mirror support member is in said viewfinder light-guiding position, said first shock-absorbing member is held in a non-contact position with respect to said main-mirror support member by said second shock-absorbing member positioned in said second shock-absorbing stand-by position, and
    wherein, when said sub-mirror support member is in said jutting-out position, said third shock-absorbing member is held in a non-contact position with respect to said sub-mirror support member by said first shock-absorbing member.

2. The movable-mirror drive mechanism according to claim 1, wherein each of said first shock-absorbing member and said third shock-absorbing member is rotatable about an axis substantially parallel to said first axis and said second axis,
    wherein said first shock-absorbing member is disengaged from said third shock-absorbing member when held in said first shock-absorbing stand-by position, said first shock-absorbing member including a press portion which comes into contact with said third shock-absorbing member and presses and moves said third shock-absorbing member to said non-contact position with respect to said sub-mirror support member when said first shock-absorbing member rotates to said non-contact position with respect to said main-mirror support member.

3. The movable-mirror drive mechanism according to claim 2, wherein said second shock-absorbing member is linearly movable along a plane in which said first shock-absorbing member rotates, and
    wherein said second shock-absorbing member comprises a rotation-restricting portion which moves into a path of rotational movement of said first shock-absorbing member to restrict a range of rotational movement of said first shock-absorbing member when said second shock-absorbing member is in said second shock-absorbing stand-by position, and which retracts from said path of rotational movement of said first shock-absorbing member when said second shock-absorbing member is pressed and moved from said second shock-absorbing stand-by position by said main-mirror support member in a direction opposite to a biasing direction of said second biaser.

4. The movable-mirror drive mechanism according to claim 1, wherein said first shock-absorbing member, said second shock-absorbing member and said third shock-absorbing member are supported by a side of a mirror box, of said camera, that supports said main-mirror support member and said sub-mirror support member inside said mirror box,
wherein each of said first shock-absorbing member and said second shock-absorbing member includes a projection which projects into the inside of said mirror box to lie on a rotational movement path of said main-mirror support member,
wherein said third shock-absorbing member includes a projection which projects into the inside of said mirror box to lie on a rotational movement path of said sub-mirror support member,
wherein said movable-mirror drive mechanism includes, inside said mirror box, a main-mirror positioning portion which defines said viewfinder light-guiding position of said main-mirror support member and a sub-mirror positioning portion which defines said jutting-out position of said sub-mirror support member,
wherein said second shock-absorbing member holds said first shock-absorbing member in a position in which said protrusion of said first shock-absorbing member is disengaged from said main-mirror support member when said main-mirror support member is held in said viewfinder light-guiding position by engagement with said main-mirror positioning portion, and
wherein said first shock-absorbing member holds said third shock-absorbing member in a position in which said protrusion of said third shock-absorbing member is disengaged from said sub-mirror support member when said sub-mirror support member is held in said jutting-out position by engagement with said sub-mirror positioning portion.

5. The movable-mirror drive mechanism according to claim 4, wherein said mirror box comprises:
a first stopper which comes into contact with said first shock-absorbing member by said biasing force of said first biaser to define said first shock-absorbing stand-by position;
a second stopper which comes into contact with said second shock-absorbing member by said biasing force of said second biaser to define said second shock-absorbing stand-by position; and
a third stopper which comes into contact with said third shock-absorbing member by said biasing force of said third biaser to define said third shock-absorbing stand-by position.

6. The movable-mirror drive mechanism according to claim 1, wherein said first biaser, said second biaser and said third biaser comprise a first spring, a second spring and a third spring, respectively, which are independent of one another.

7. A movable-mirror drive mechanism of a camera, comprising:
a main-mirror support member which supports a main mirror and is supported to be rotatable about a first axis between a viewfinder light-guiding position, in which said main mirror is positioned in a photographing optical path to reflect incident light emanated from an object toward a viewfinder optical system of said camera, and a retracted position, in which said main mirror is retracted from said photographing optical path to allow said object-emanated light to travel toward a photographic light-receiving medium;
a sub-mirror support member which supports a sub-mirror and is supported to be rotatable relative to said main-mirror support member about a second axis which is substantially parallel to said first axis and is positioned in a jutting-out position, in which said sub-mirror juts from said main mirror in said photographing optical path, when said main-mirror support member is in said viewfinder light-guiding position, and which is positioned in a sub-mirror retracted position, in which said sub-mirror is retracted to a back of said main mirror, when said main-mirror support member is in said retracted position;
a first shock-absorbing member which is held in a first shock-absorbing stand-by position by a first biaser, said first shock-absorbing member coming into contact with said main-mirror support member and being pressed and moved thereby against a biasing force of said first biaser to absorb shock of said main-mirror support member when said main-mirror support member rotates from said viewfinder light-guiding position to said retracted position;
a second shock-absorbing member which is held in a second shock-absorbing stand-by position by a second biaser, said second shock-absorbing member coming into contact with said main-mirror support member and being pressed and moved thereby against a biasing force of said second biaser to absorb shock of said main-mirror support member when said main-mirror support member rotates from said retracted position to said viewfinder light-guiding position; and
a third shock-absorbing member which is held in a third shock-absorbing stand-by position by a third biaser, said third shock-absorbing member coming into contact with said sub-mirror support member and being pressed and moved thereby against a biasing force of said third biaser to absorb shock of said sub-mirror support member when said sub-mirror support member rotates from said jutting-out position to said sub-mirror retracted position in association with rotation of said main-mirror support member to said retracted position,
wherein, when said main-mirror support member is in said retracted position, said first shock-absorbing member is held in a non-contact position with respect to said main-mirror support member by said second shock-absorbing member positioned in said second shock-absorbing stand-by position, and
wherein, when said sub-mirror support member is in said sub-mirror retracted position, said third shock-absorbing member is held in a non-contact position with respect to said sub-mirror support member by said first shock-absorbing member.

8. A movable-mirror drive mechanism of a camera, comprising:
a main-mirror support member which supports a main mirror and is supported to be rotatable about a first axis between a mirror-down position, in which said main mirror is positioned in a photographing optical path, and a mirror-up position, in which said main mirror is retracted from said photographing optical path;
a sub-mirror support member which supports a sub-mirror and is supported to be rotatable relative to said main-mirror support member about a second axis which is substantially parallel to said first axis and is positioned in a jutting-out position, in which said sub-mirror juts from said main mirror in said photographing optical path, when said main-mirror support member is in said mirror-down position, and which is positioned in a retracted position, in which said sub-mirror is retracted to a back of said main mirror, when said main-mirror support member is in said mirror-up position;

a main-mirror shock-absorbing member which is held in a main-mirror shock-absorbing stand-by position by a main-mirror shock-absorbing biaser, said main-mirror shock-absorbing member coming into contact with said main-mirror support member and being pressed and moved thereby against a biasing force of said main-mirror shock-absorbing biaser to absorb shock of said main-mirror support member when said main-mirror support member rotates from said mirror-up position to said mirror-down position; and a sub-mirror shock-absorbing member which is held in a sub-mirror shock-absorbing stand-by position by a sub-mirror shock-absorbing biaser, said sub-mirror shock-absorbing member coming into contact with said sub-mirror support member and being pressed and moved thereby against a biasing force of said sub-mirror shock-absorbing biaser to absorb shock of said sub-mirror support member when said sub-mirror support member rotates from said retracted position to said jutting-out position in association with rotation of said main-mirror support member to said mirror-down position, wherein said main-mirror shock-absorbing member includes a press portion which comes into contact with said sub-mirror shock-absorbing member and presses and moves said sub-mirror shock-absorbing member to disengage said sub-mirror shock-absorbing member from said sub-mirror support member in a state where at least said main-mirror support member is in said mirror-down position.

* * * * *